(12) United States Patent
Chen

(10) Patent No.: US 9,128,266 B2
(45) Date of Patent: Sep. 8, 2015

(54) IMAGE CAPTURING OPTICAL LENS ASSEMBLY, IMAGE CAPTURING DEVICE AND MOBILE TERMINAL

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 101 days.

(21) Appl. No.: 14/166,875

(22) Filed: Jan. 29, 2014

(65) Prior Publication Data

US 2015/0185440 A1 Jul. 2, 2015

(30) Foreign Application Priority Data

Dec. 31, 2013 (TW) .............................. 102149326 A

(51) Int. Cl.
| | |
|---|---|
| *G02B 9/60* | (2006.01) |
| *G02B 13/00* | (2006.01) |
| *G02B 3/04* | (2006.01) |
| *H04N 5/225* | (2006.01) |
| *H04N 5/335* | (2011.01) |

(52) U.S. Cl.
CPC .............. *G02B 13/0045* (2013.01); *G02B 3/04* (2013.01); *H04N 5/2254* (2013.01); *H04N 5/335* (2013.01)

(58) Field of Classification Search
CPC ........ G02B 13/0045; G02B 3/04; G02B 3/02; G02B 9/60
See application file for complete search history.

(56) References Cited

U.S. PATENT DOCUMENTS

| | | | |
|---|---|---|---|
| 8,649,113 B1 * | 2/2014 | Tsai et al. ..................... 359/714 |
| 8,780,459 B2 | 7/2014 | Chen et al. | |
| 8,934,180 B2 | 1/2015 | Hsu et al. | |
| 2012/0162769 A1 | 6/2012 | Suzuki et al. | |

FOREIGN PATENT DOCUMENTS

TW 201403117 A 1/2014

* cited by examiner

*Primary Examiner* — Joseph P Martinez
(74) *Attorney, Agent, or Firm* — CKC & Partners Co., Ltd.

(57) ABSTRACT

An image capturing optical lens assembly includes, in order from an object side to an image side, a first lens element, a second lens element, a third lens element, a fourth lens element, and a fifth lens element. The first lens element with refractive power has an object-side surface being convex in a paraxial region thereof. The second lens element with positive refractive power has an object-side surface being convex in a paraxial region thereof. The third lens element has negative refractive power. The fourth lens element with positive refractive power has an image-side surface being convex in a paraxial region thereof. The fifth lens element with positive refractive power has an object-side surface being convex in a paraxial region thereof and an image-side surface being concave in a paraxial region thereof. The image capturing optical lens assembly has a total of five lens elements with refractive power.

22 Claims, 20 Drawing Sheets

IMAGE CAPTURING OPTICAL LENS ASSEMBLY, IMAGE CAPTURING DEVICE AND MOBILE TERMINAL

RELATED APPLICATIONS

This application claims priority to Taiwan Application Serial Number 102149326, filed Dec. 31, 2013, which is incorporated by reference herein in its entirety.

BACKGROUND

1. Technical Field

The present disclosure relates to an image capturing optical lens assembly, an image capturing device and a mobile terminal. More particularly, the present disclosure relates to a compact image capturing optical lens assembly and an image capturing device applicable to a mobile terminal.

2. Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with five-element lens structure enhance image quality and resolution. However, the arrangement of the positive refractive powers is not favorable for effectively enlarging field of view and improving its relative illumination. Moreover, it is not favorable for correcting aberration of an incident light at a larger incident angle which thereby results in a worse image quality.

SUMMARY

According to one aspect of the present disclosure, an image capturing optical lens assembly includes, in order from an object side to an image side, a first lens element, a second lens element, a third lens element, a fourth lens element, and a fifth lens element. The first lens element with refractive power has an object-side surface being convex in a paraxial region thereof. The second lens element with positive refractive power has an object-side surface being convex in a paraxial region thereof. The third lens element has negative refractive power. The fourth lens element with positive refractive power has an image-side surface being convex in a paraxial region thereof, wherein an object-side surface and the image-side surface of the fourth lens element are aspheric. The fifth lens element with positive refractive power has an object-side surface being convex in a paraxial region thereof and an image-side surface being concave in a paraxial region thereof, wherein the image-side surface of the fifth lens element has at least one convex shape in an off-axis region thereof, and the object-side surface and the image-side surface of the fifth lens element are aspheric. The image capturing optical lens assembly has a total of five lens elements with refractive power. When an axial distance between the object-side surface of the first lens element and an image plane is TL, a curvature radius of an mage-side surface of the first lens element is R2, a vertical distance between a non-axial critical point on the image-side surface of the fifth lens element and an optical axis is Yc52, a central thickness of the second lens element is CT2, and a central thickness of the fourth lens element is CT4, the following conditions are satisfied:

$TL/R2 < 4.8;$ $TL/Yc52 < 4.5;$ and $0 < CT2/CT4 < 1.25.$

According to another aspect of the present disclosure, an image capturing device includes the image capturing optical lens assembly according to the aforementioned aspect and an image sensor, wherein the image sensor is disposed on an image side of the fifth lens element of the image capturing optical lens assembly.

According to still another aspect of the present disclosure, a mobile terminal includes the image capturing device according to the aforementioned aspect.

According to yet another aspect of the present disclosure, an image capturing optical lens assembly includes, in order from an object side to an image side, a first lens element, a second lens element, a third lens element, a fourth lens element, and a fifth lens element. The first lens element with refractive power has an object-side surface being convex in a paraxial region thereof. The second lens element has positive refractive power. The third lens element with refractive power has an image-side surface being concave in a paraxial region thereof. The fourth lens element with refractive power has an image-side surface being convex in a paraxial region thereof, wherein an object-side surface and the image-side surface of the fourth lens element are aspheric. The fifth lens element with positive refractive power has an object-side surface being convex in a paraxial region thereof and an image-side surface being concave in a paraxial region thereof, wherein the image-side surface of the fifth lens element has at least one convex shape in an off-axis region thereof, and the object-side surface and the image-side surface of the fifth lens element are aspheric. The image capturing optical lens assembly has a total of five lens elements with refractive power. When an axial distance between the object-side surface of the first lens element and an image plane is TL, a curvature radius of an image-side surface of the first lens element is R2, and a vertical distance between a non-axial critical point on the image-side surface of the fifth lens element and an optical axis is Yc52, the following conditions are satisfied:

$TL/R2 < 4.80;$ and $TL/Yc52 < 4.50.$

According to still yet another aspect of the present disclosure, an image capturing device includes the image capturing optical lens assembly according to the foregoing aspect and an image sensor, wherein the image sensor is disposed on an image side of the fifth lens element of the mage capturing optical lens assembly.

According to a further aspect of the present disclosure, a mobile terminal includes the image capturing device according to the foregoing aspect.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
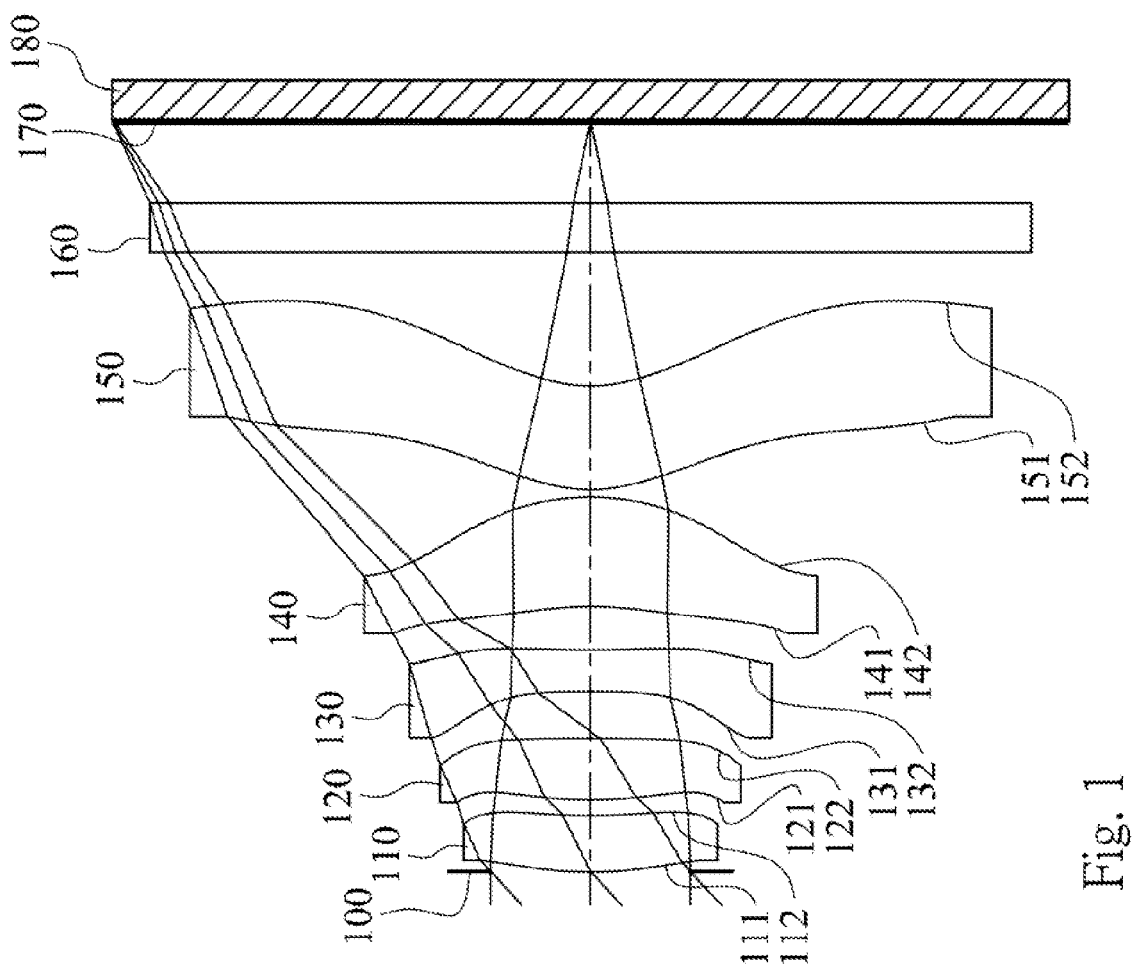
FIG. 1 is a schematic view of an image capturing device according to the 1st embodiment of the present disclosure.

An image capturing optical lens assembly includes, in order from an object side to an image side, a first lens element, a second lens element, a third lens element, a fourth lens element, and a fifth lens element. The image capturing optical lens assembly has a total of five lens elements with refractive power.

The first lens element has an object-side surface being convex in a paraxial region thereof, so that it is favorable for reducing the total track length of the image capturing optical lens assembly.

The second lens element with positive refractive power can have an object-side surface being convex in a paraxial region thereof. Therefore, it is favorable for arranging the positive refractive powers and avoiding excessive aberration.

The third lens element can have negative refractive power and an image-side surface being concave in a paraxial region thereof. Therefore, it is favorable for correcting the aberration of the image capturing optical lens assembly.

The fourth lens element can have positive refractive power and an object-side surface being concave in a paraxial region thereof, and has an image-side surface being convex in a paraxial region thereof. Therefore, it is favorable for further correcting astigmatism and spherical aberration.

The fifth lens element with positive refractive power has an object-side surface being convex in a paraxial region thereof and an image-side surface being concave in a paraxial region thereof, wherein the image-side surface of the fifth lens element has at least one convex shape in an off-axis region thereof. Moreover, the refractive power of the fifth lens element can change from positive at a paraxial region to negative at an off-axis region of the fifth lens element. Therefore, it is favorable for enlarging the field of view of the image capturing optical lens assembly through arranging the positive refractive powers of the second and the fifth lens elements. Furthermore, it is favorable for reducing the incident angle of the off-axis on the image plane so as to improve the relative illumination and correct the aberration of an incident light at a larger incident angle.

When an axial distance between an object-side surface of the first lens element and an image plane is TL, and a curvature radius of an image-side surface of the first lens element is R2, the following condition is satisfied: TL/R2<4.8. Therefore, it is favorable for reducing the total track length of the image capturing optical lens assembly so as to keep a compact size thereof. Preferably, the following condition is satisfied: −2.0<TL/R2<4.0.

When the axial distance between an object-side surface of the first lens element and an image plane is IL, and a vertical distance between a non-axial critical point on the image-side surface of the fifth lens element and an optical axis is Yc52, the following condition is satisfied: TL/Yc52<4.5. Therefore, it is favorable for correcting the aberration of the off-axis so as to maintain a compact size.

When a central thickness of the second lens element is CT2, and a central thickness of the fourth lens element is CT4, the following condition is satisfied: 0<CT2/CT4<1.25. Therefore, it provides favorable moldability and homogeneity for plastic lens elements during the injection molding process.

When a focal length of the first lens element is f1, and a focal length of the second lens element is f2, the following condition is satisfied: 0<f2/|f1|<1.0. Therefore, it is favorable for arranging the refractive powers so as to avoid excessive aberration.

When a curvature radius of the object-side surface of the third lens element is R5, and a curvature radius of the image-side surface of the third lens element is R6, the following condition is satisfied: −0.6<(R5+R6)/(R5−R6). Therefore, it is favorable for properly adjusting the surface curvature of the third lens element so as to correct the aberration of the image capturing optical lens assembly.

When an axial distance between the third lens element and the fourth lens element is T34, and an axial distance between the fourth lens element and the fifth lens element is T45, the following condition is satisfied: 0<T45/T34<10.0. Therefore, it is favorable for reducing the total track length of the image capturing optical lens assembly by properly adjusting the axial distances between lens elements so as to maintain a compact size.

In the present disclosure, the aforementioned image capturing optical lens assembly can further include a stop, such as an aperture stop, wherein an axial distance between the stop and the image-side surface of the fifth lens element is Sd, and an axial distance between the object-side surface of the first lens element and the image-side surface of the fifth lens element is Td, the following condition is satisfied: $0.80<Sd/Td<1.10$. Therefore it is favorable for enhancing the telecentricity of the image capturing optical lens assembly.

When a focal length of the fifth lens element is f5, and a curvature radius of the image-side surface of the fifth lens element is R10, the following condition is satisfied: $5.0<f5/R10$. Therefore, it is favorable for reducing the incident angle of the off-axis on the image plane so as to improve its relative illumination and correct the aberration of an incident light at a larger incident angle.

When a curvature radius of the image-side surface of the fourth lens element is R8, and a focal length of the image capturing optical lens assembly is f, the following condition is satisfied: $R8/f<-0.30$. Therefore, it is favorable for further correcting the astigmatism and spherical aberration of the image capturing optical lens assembly.

When half of a maximal field of view of the image capturing optical lens assembly is HFOV the following condition is satisfied: $0.85<1/\tan(HFOV)<1.40$. Therefore, it is favorable for having a larger field of view so as to obtain more of the image scene.

When the focal length of the image capturing optical lens assembly is f, and the focal length of the second lens element is f2, the following condition is satisfied: $0.5<f/f2<2.0$. Therefore, it is favorable for arranging the refractive power of the second lens element so as to avoid aberration.

According to the image capturing optical lens assembly of the present disclosure, the lens elements thereof can be made of glass or plastic material. When the lens elements are made of glass material, the distribution of the refractive power of the image capturing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have a more controllable variables for eliminating the aberration thereof, and to further decrease the required number of the lens elements. Therefore, the total track length of the image capturing optical lens assembly can also be reduced.

According to the image capturing optical lens assembly of the present disclosure, each of an object-side surface and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the image capturing optical lens assembly of the present disclosure, critical point is a non-axial point of the lens surface where its tangent is perpendicular to an optical axis.

According to the image capturing optical lens assembly of the present disclosure, the image capturing optical lens assembly can include at least one stop, such as an aperture stop, a glare stop or a field stop. Said glare stop or said field stop is for eliminating the stray light and thereby improving the image resolution thereof.

According to the image capturing optical lens assembly of the present disclosure, an aperture stop can be configured as a front stop or a middle stop. A front stop disposed between an imaged object and the first lens element can provide a longer distance between an exit pupil of the image capturing optical lens assembly and the image plane and thereby improves the image-sensing efficiency of an image sensor. A middle stop disposed between the first lens element and the image plane is favorable for enlarging the field of view of the image capturing optical lens assembly and thereby provides a wider field of view for the same.

The present image capturing optical lens assembly can be optionally applied to moving focus optical systems. According to the image capturing optical lens assembly of the present disclosure, the image capturing optical lens assembly is featured with good correction ability and high image quality, and can be applied to 3D (three-dimensional) image capturing applications, in products such as digital cameras, mobile devices, digital tablets, wearable devices and other mobile terminals.

According to the present disclosure, an image capturing device is provided. The image capturing device includes the image capturing optical lens assembly according to the aforementioned image capturing optical lens assembly of the present disclosure and an image sensor, wherein the image sensor is disposed on or near an image plane of the aforementioned image capturing optical lens assembly. Therefore, it is favorable for enlarging, the field of view of the image capturing optical lens assembly and reducing the incident angle of the off-axis on the image plane through arranging the positive refractive powers of the second and the fifth lens elements so as to improve the relative illumination of the image capturing optical lens assembly and correct the aberration of an incident light at a larger incident angle. In some embodiments, the image capturing device can further include a barrel member, a holding member or a combination thereof.

According to the present disclosure, a mobile terminal is provided, wherein the mobile terminal includes the aforementioned image capturing device. Therefore, it is favorable for the mobile terminal obtaining good image quality. Preferably, the mobile terminal can further include but not limited to display, control unit, random access memory unit (RAM) a read only memory unit (ROM) or a combination thereof.

According to the above description of the present disclosure, the following specific embodiments are provided for further explanation.

1st Embodiment

Figure 2:
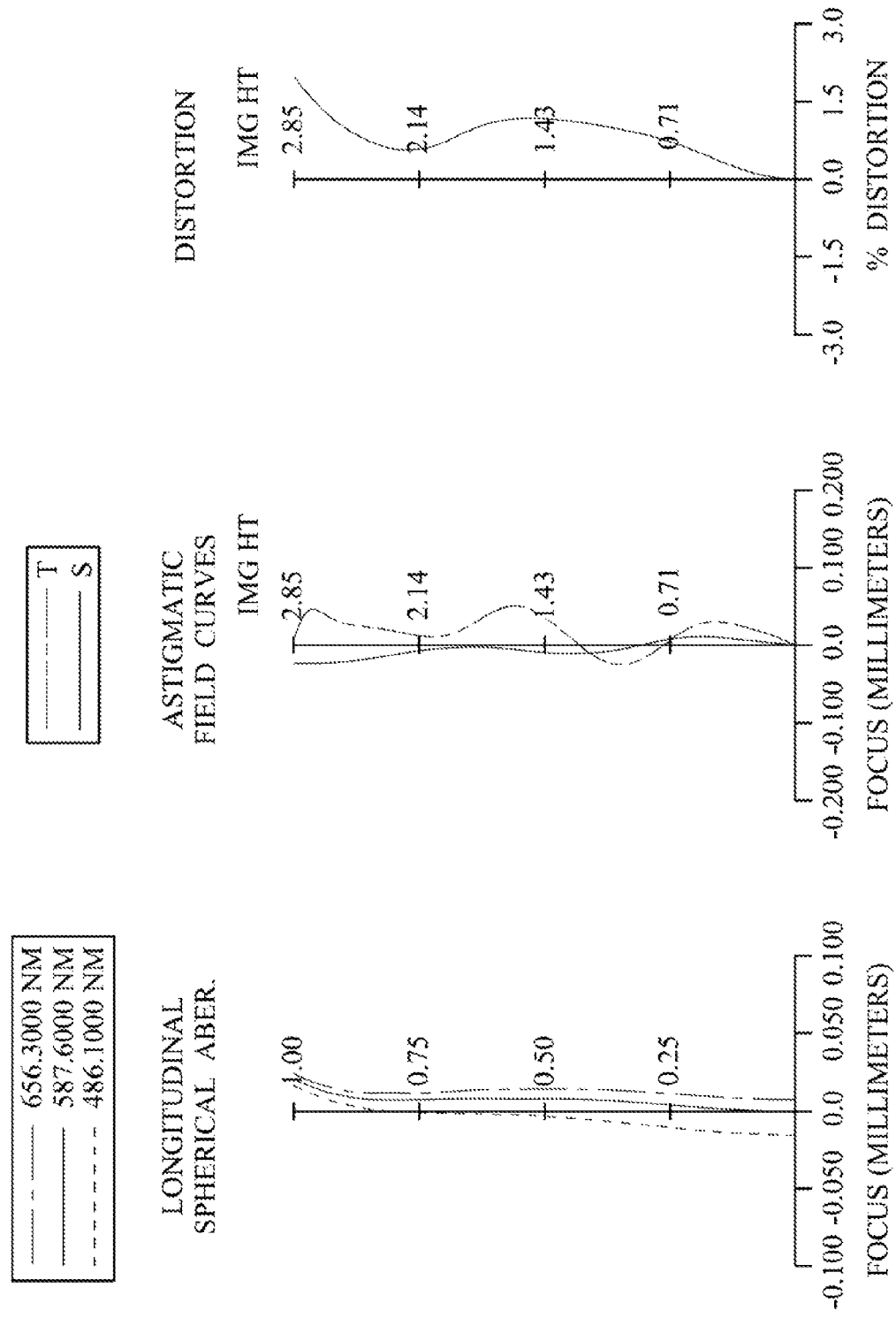
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows, in order from left to right, spherical aberration curves, astigmatic field curves and a distortion curve of the image capturing device according to the 1st embodiment. In FIG. 1, the image capturing device includes the image capturing optical lens assembly (not otherwise herein labeled) of the present disclosure and an image sensor 180. The image capturing optical lens assembly includes, in order from an object side to an image side, an aperture stop 100, a first lens element 110, a second lens element 120, a third lens element 130, a fourth lens element 140, a fifth lens element 150, an IR-cut filter 160 and an image plane 170, wherein the image capturing optical lens assembly has a total of five lens elements (110-150) with refractive power.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with positive refractive power has an object-side surface 151 being convex in a paraxial region thereof and an image-side surface 152 being concave in a paraxial region thereof, wherein the image-side surface 152 of the fifth lens element 150 has at least one convex shape in an off-axis region thereof. The fifth lens element 150 is made of plastic material and has the object-side surface 151 and the image-side surface 152 being both aspheric. Moreover, the refractive power of the fifth lens element 150 changes from positive at a paraxial region to negative at an off-axis region of the fifth lens element 150.

The IR-cut filter 160 is made of glass and located between the fifth lens element 150 and the image plane 170, and will not affect the focal length of the image capturing optical lens assembly. The image sensor 180 is disposed on or near the image plane 170 of the image capturing optical lens assembly. The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where, X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the image capturing optical lens assembly of the image capturing device according to the 1st embodiment, when a focal length of the image capturing optical lens assembly is f, an f-number of the image capturing optical lens assembly is Fno and half of a maximal field of view of the image capturing optical lens assembly is HFOV, these parameters have the following values: f=2.99 mm; Fno=2.50; and HFOV=43.1 degrees.

In the image capturing optical lens assembly of the image capturing device according to the 1st embodiment, when a central thickness of the second lens element 120 is CT2, and a central thickness of the fourth lens element 140 is CT4, the following condition is satisfied: CT2/CT4=0.56.

In the image capturing optical lens assembly of the image capturing device according to the 1st embodiment, when an axial distance between the third lens element 130 and the fourth lens element 140 is T34, and an axial distance between the fourth lens element 140 and the fifth lens element 150 is T45, the following condition is satisfied: T45/T34=0.19.

In the image capturing optical lens assembly according to the 1st embodiment, when an axial distance between the aperture stop 100 and the image-side surface 152 of the fifth lens element 150 is Sd and an axial distance between the object-side surface 111 of the first lens element 110 and the image-side surface 152 of the fifth lens element 150 is Td, the following condition is satisfied: Sd/Td=1.00.

Figure 17:
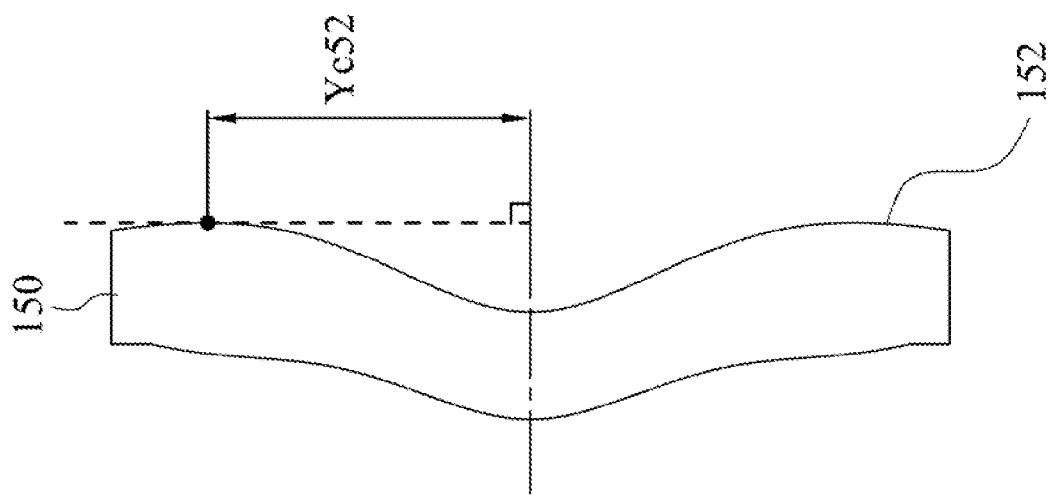
FIG. 17 shows Yc52 of the image-side surface of the fifth lens element according to FIG. 1.

FIG. 17 shows Yc52 of the image-side surface 152 of the fifth lens element 150 according to FIG. 1. In the image capturing optical lens assembly of the image capturing device according to the 1st embodiment, when an axial distance between the object-side surface 111 of the first lens element 110 and the image plane 170 is TL, a vertical distance between a non-axial critical point on the image-side surface 152 of the fifth lens element 150 and an optical axis is Yc52, and a curvature radius of the image-side surface 112 of the first lens element 110 is R2, the following conditions are satisfied: TL/Yc52=2.43; and TL/R2=1.32.

In the image capturing optical lens assembly of the image capturing device according to the 1st embodiment, when a curvature radius of the object-side surface 131 of the third lens element 130 is R5, and a curvature radius of the image-side surface 132 of the third lens element 130 is R6, the following condition is satisfied: (R5+R6)/(R5−R6)=0.10.

In the image capturing optical lens assembly of the image capturing device according to the 1st embodiment, when a curvature radius of the image-side surface 142 of the fourth lens element 140 is R8, and the focal length of the image capturing optical lens assembly is f, the following condition is satisfied: R8/f=−0.50.

In the image capturing optical lens assembly of the image capturing device according to the 1st embodiment, when a focal length of the fifth lens element 150 is f5, and a curvature radius of the image-side surface 152 of the fifth lens element 150 is R10, the following condition is satisfied: f5/R10=11.57.

In the image capturing optical lens assembly of the image capturing device according to the 1st embodiment, when a focal length of the first lens element 110 is f1, and a focal length of the second lens element 120 is f2, the following condition is satisfied: f2/|f1|=0.35.

In the image capturing optical lens assembly of the image capturing device according to the 1st embodiment, when the focal length of the image capturing optical lens assembly is f, and the focal length of the second lens element 120 is f2, the following condition is satisfied: f/f2=0.66.

In the image capturing optical lens assembly of the image capturing device according to the 1st embodiment, when half of the maximal field of view of the image capturing optical lens assembly is HFOV, and the following condition is satisfied: 1/tan(HFOV)=1.07.

The detailed optical data of the 1st embodiment are shown in Table 1 and the aspheric surface data are shown in Table 2 below.

TABLE 1

1st Embodiment
f = 2.99 mm, Fno = 2.50, HFOV = 43.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.002 | | | | |
| 2 | Lens 1 | 2.363 | ASP | 0.337 | Plastic | 1.544 | 55.9 | 12.85 |
| 3 | | 3.390 | ASP | 0.094 | | | | |
| 4 | Lens 2 | 2.523 | ASP | 0.365 | Plastic | 1.544 | 55.9 | 4.53 |
| 5 | | −102.237 | ASP | 0.284 | | | | |
| 6 | Lens 3 | −7.028 | ASP | 0.244 | Plastic | 1.633 | 23.4 | −4.96 |
| 7 | | 5.750 | ASP | 0.262 | | | | |
| 8 | Lens 4 | −2.066 | ASP | 0.653 | Plastic | 1.544 | 55.9 | 6.96 |
| 9 | | −1.485 | ASP | 0.050 | | | | |
| 10 | Lens 5 | 0.976 | ASP | 0.616 | Plastic | 1.535 | 55.7 | 10.63 |
| 11 | | 0.919 | ASP | 0.800 | | | | |
| 12 | IR-cut filter | Plano | | 0.300 | Glass | 1.517 | 64.2 | — |
| 13 | | Plano | | 0.484 | | | | |
| 14 | Image | Plano | | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k= | −5.3115E+00 | −1.0924E+01 | −5.2642E+00 | −2.0000E+01 | 2.8813E+01 |
| A4= | −2.5353E−02 | −1.4437E−01 | −4.7904E−02 | −8.0616E−02 | −3.8672E−01 |
| A6= | −3.4096E−02 | −3.5922E−01 | −2.9384E−01 | −1.4579E−01 | −2.0271E−01 |
| A8= | −4.4880E−01 | −3.2800E−02 | 7.1115E−04 | 9.1553E−03 | 4.5186E−01 |
| A10= | 1.3220E+00 | 2.4829E−02 | −7.5404E−01 | −5.3985E−01 | −6.4168E−01 |
| A12= | −2.5050E+00 | 5.3078E−02 | 7.5678E−01 | 5.9919E−13 | 1.2212E+00 |
| A14= | 1.5344E+00 | −2.9896E−01 | −3.4389E−01 | −1.0545E−01 | −6.8467E−01 |
| A16= | −5.5299E−01 | −1.0450E−01 | 2.1420E−01 | 6.2591E−02 | 4.3463E−02 |

| Surface # | 7 | 8 | 9 | 10 | 11 |
|---|---|---|---|---|---|
| k= | −2.0000E+01 | −1.9650E+01 | −3.5674E−02 | −4.0207E+00 | −9.8799E−01 |
| A4= | −2.4157E−01 | 1.2454E−01 | −1.3662E−01 | −5.6617E−02 | −2.9795E−01 |
| A6= | 2.3730E−01 | −1.6150E−01 | 3.1600E−01 | −2.1733E−02 | 1.2615E−01 |
| A8= | −5.2093E−01 | 2.3771E−01 | −3.1413E−01 | 2.0623E−02 | −4.3155E−02 |
| A10= | 7.1706E−01 | −3.7372E−01 | 2.8102E−01 | −5.5628E−03 | 1.0303E−02 |
| A12= | −4.5450E−01 | 3.4901E−01 | −1.4907E−01 | 6.6392E−04 | −1.5462E−03 |
| A14= | 1.1178E−01 | −1.7392E−01 | 4.0490E−02 | −2.7418E−05 | 1.2986E−04 |
| A16= | 5.1733E−03 | 3.5376E−02 | −4.1717E−03 | −4.1103E−07 | −4.6469E−06 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
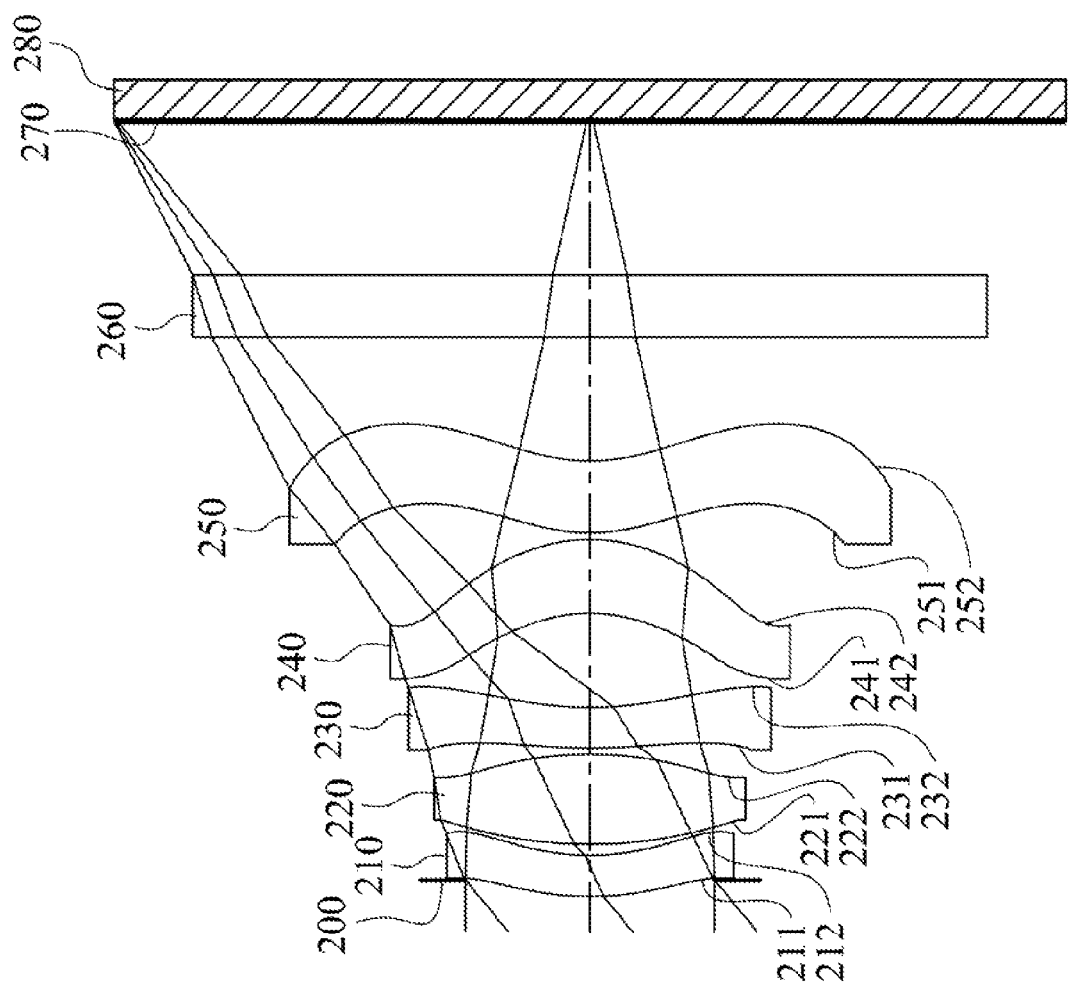
FIG. 3 is a schematic view of an image capturing device according to the 2nd embodiment of the present disclosure.
Figure 4:
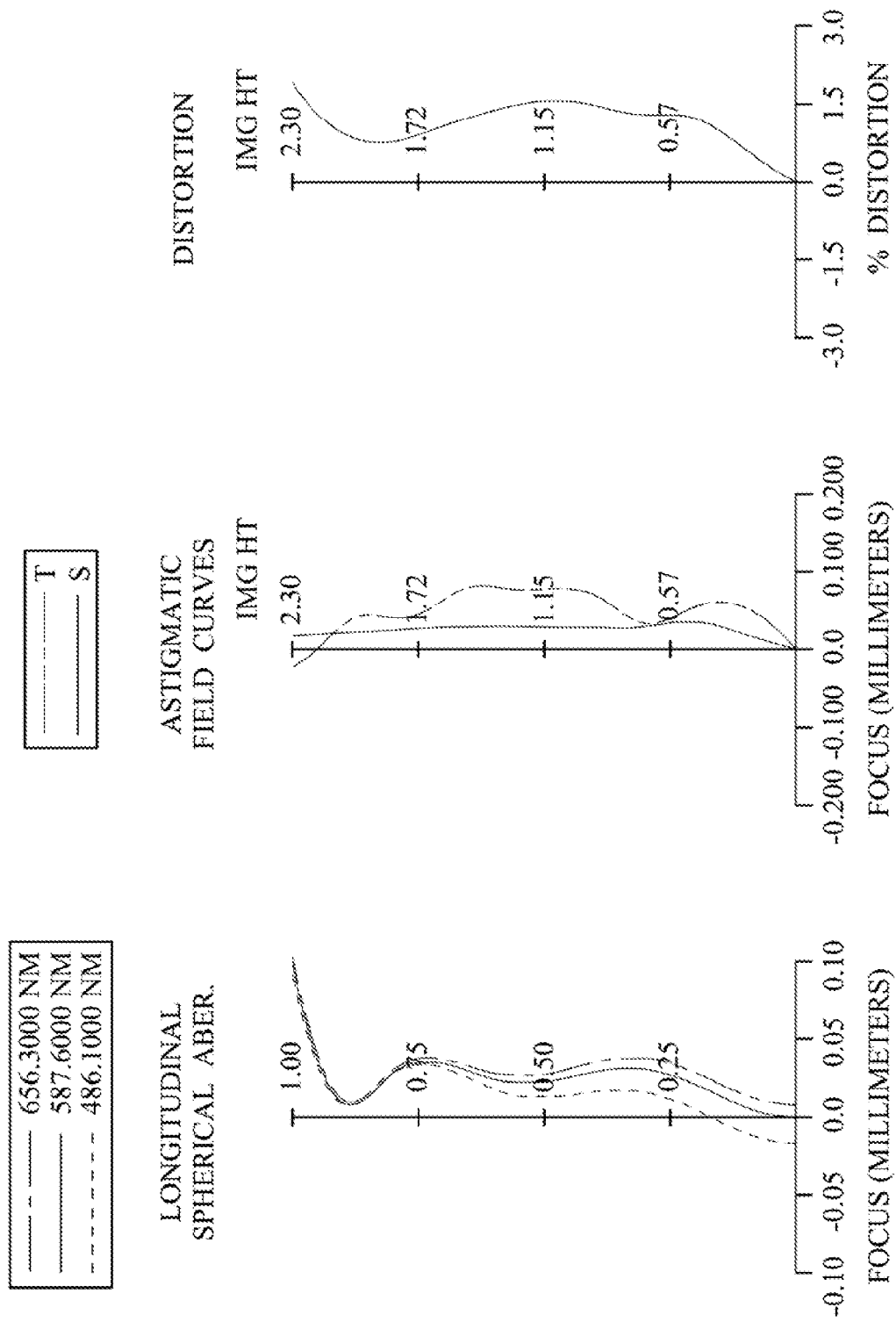
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows, in order from left to right, spherical aberration curves, astigmatic field curves and a distortion curve of the image capturing device according to the 2nd embodiment. In FIG. 3, the image capturing device includes the image capturing optical lens assembly (not otherwise herein labeled) of the present disclosure and an image sensor 280. The image capturing optical lens assembly includes, in order from an object side to an image side, an aperture stop 200, a first lens element 210, a second lens element 220, a third lens element 230 a fourth lens element 240, a fifth lens element 250, an IR-cut filter 260 and an image plane 270, wherein the image capturing optical lens assembly has a total of five lens elements (210-250) with refractive power.

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being convex in a paraxial region thereof. The second lens element 220 is made of plastic material and has the object-side surface 221 and the mage-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being concave in a paraxial region thereof, wherein the image-side surface 252 of the fifth lens element 250 has at least one convex shape in an off-axis region thereof. The fifth lens element 250 is made of plastic material and has the object-side surface 251 and the image-side surface 252 being both aspheric. Moreover, the refractive power of the fifth lens element 250 changes from positive at a paraxial region to negative at an off-axis region of the fifth lens element 250.

The IR-cut filter 260 is made of glass and located between the fifth lens element 250 and the image plane 270, and will not affect the focal length of the image capturing optical lens assembly. The image sensor 280 is disposed on or near the image plane 270 of the image capturing optical lens assembly.

The detailed optical data of the 2nd embodiment are shown in Table 3 and the aspheric surface data are shown in Table 4 below.

TABLE 3

2nd Embodiment
f = 2.71 mm, Fno = 2.25, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.080 | | | | |
| 2 | Lens 1 | 1.376 | ASP | 0.200 | Plastic | 1.640 | 23.3 | −19.30 |
| 3 | | 1.168 | ASP | 0.054 | | | | |
| 4 | Lens 2 | 2.415 | ASP | 0.432 | Plastic | 1.544 | 55.9 | 2.01 |
| 5 | | −1.870 | ASP | 0.030 | | | | |
| 6 | Lens 3 | 2.946 | ASP | 0.200 | Plastic | 1.640 | 23.3 | −6.11 |
| 7 | | 1.635 | ASP | 0.453 | | | | |
| 8 | Lens 4 | −0.716 | ASP | 0.360 | Plastic | 1.570 | 57.0 | 17.51 |
| 9 | | −0.790 | ASP | 0.030 | | | | |
| 10 | Lens 5 | 0.895 | ASP | 0.350 | Plastic | 1.535 | 55.7 | 18.05 |
| 11 | | 0.851 | ASP | 0.600 | | | | |
| 12 | IR-cut filter | Plano | | 0.300 | Glass | 1.517 | 64.2 | — |
| 13 | | Plano | | 0.746 | | | | |
| 14 | Image | Plano | | — | | | | |

Note:
Reference wavelength is 587.6 nm (d-line).

TABLE 4

| Aspheric Coefficients | | | | | |
|---|---|---|---|---|---|
| Surface # | 2 | 3 | 4 | 5 | 6 |
| k= | −4.0972E+00 | −3.1534E+00 | −2.3775E+01 | −1.4110E+01 | 9.9425E−01 |
| A4= | −1.9720E−02 | 1.3710E−02 | 2.3685E−01 | −1.8980E−01 | −3.2704E−01 |
| A6= | −3.8022E−01 | −2.7510E−02 | 1.5137E−01 | −2.7747E+00 | 5.2167E−02 |
| A8= | −1.2022E+00 | −2.1266E+00 | −1.4975E+00 | 2.7818E+01 | 2.6119E−01 |
| A10= | 4.4797E+00 | 2.3960E+00 | 1.7788E+00 | −1.2866E+02 | −2.2179E+00 |
| A12= | −5.8941E+00 | −1.6654E+00 | 1.3747E+00 | 3.1989E+02 | 5.9858E+00 |
| A14= | | | −3.0894E+00 | −3.8998E+02 | −5.1797E+00 |
| A16= | | | | 1.8214E+02 | 7.3626E−11 |
| Surface # | 7 | 8 | 9 | 10 | 11 |
| k= | −4.8151E+00 | −6.4287E+00 | −1.3915E+00 | −3.7564E+00 | −5.2932E+00 |
| A4= | −1.6263E−01 | −6.0175E−01 | 4.2602E−01 | −2.5909E−01 | −3.8193E−02 |
| A6= | 1.9057E−01 | 1.2319E+00 | −3.9844E+00 | −3.7683E−01 | −4.7818E−01 |
| A8= | −1.0802E+00 | −6.8773E+00 | 1.5276E+01 | 1.1248E+00 | 8.1339E−01 |
| A10= | 2.3959E−00 | 2.1960E+01 | −3.6801E+01 | −1.4507E+00 | −7.2190E−01 |
| A12= | −2.2354E+00 | −2.7247E+01 | 5.3036E+01 | 1.0799E+00 | 3.6496E−01 |
| A14= | 6.7507E−01 | 1.2703E+01 | −3.8969E+01 | −4.4830E−01 | −9.9626E−02 |
| A16= | 1.0513E−09 | −1.1096E+00 | 1.1166E+01 | 7.8541E−02 | 1.1246E−02 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.71 | TL/R2 | 3.22 |
| Fno | 2.25 | (R5 + R6)/(R5 − R6) | 3.49 |
| HFOV [deg.] | 39.5 | R8/f | −0.29 |
| CT2/CT4 | 1.20 | f5/R10 | 21.20 |
| T45/T34 | 0.07 | f2/|f1| | 0.10 |
| Sd/Td | 0.96 | f/f2 | 1.35 |
| TL/Yc52 | 4.15 | 1/tan(HFOV) | 1.21 |

3rd Embodiment

Figure 5:
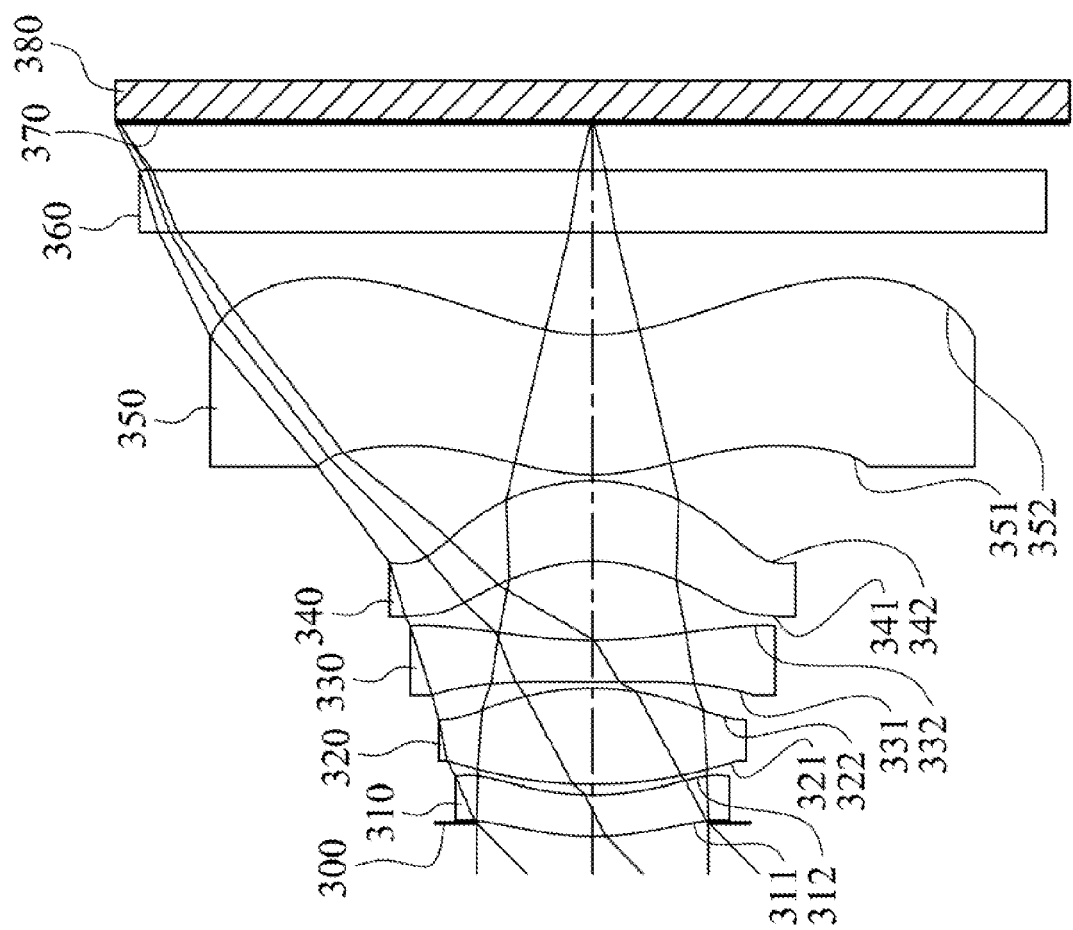
FIG. 5 is a schematic view of an image capturing device according to the 3rd embodiment of the present disclosure.
Figure 6:
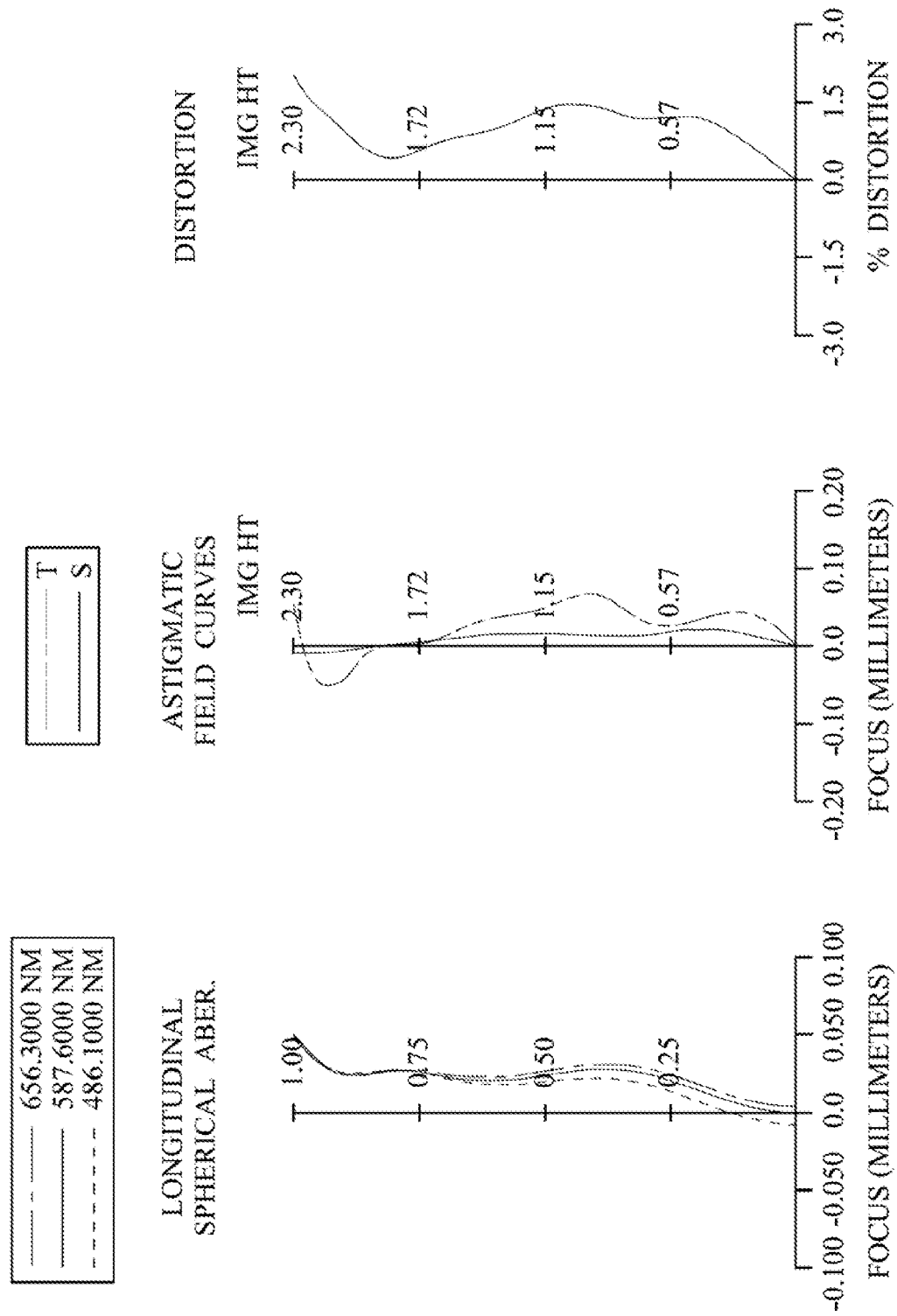
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows, in order from left to right, spherical aberration curves, astigmatic field curves and a distortion curve of the image capturing device according to the 3rd embodiment. In FIG. 5, the image capturing device includes the image capturing optical lens assembly (not otherwise herein labeled) of the present disclosure and an image sensor 380. The image capturing optical lens assembly includes, in order from an object side to an image side, an aperture stop 300, a first lens element 310, a second lens element 320, a third lens element 330, a fourth lens element 340, a fifth lens element 350, an IR-cut filter 360 and an image plane 370, wherein the image capturing optical lens assembly has a total of five lens elements (310-350) with refractive power.

The first lens element 310 with negative refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with positive refractive power has an object-side surface 351 being convex in a paraxial region thereof and an image-side surface 352 being concave in a paraxial region thereof, wherein the image-side surface 352 of the fifth lens element 350 has at least one convex shape in an off-axis region thereof. The fifth lens element 350 is made of plastic material and has the object-side surface 351 and the image-side surface 352 being both aspheric. Moreover, the refractive power of the fifth lens element 350 changes from positive at a paraxial region to negative at an off-axis region of the fifth lens element 350.

The IR-cut filter 360 is made of glass and located between the fifth lens element 350 and the image plane 370, and will not affect the focal length of the image capturing optical lens assembly. The image sensor 380 is disposed on or near the image plane 370 of the image capturing optical lens assembly.

The detailed optical data of the 3rd embodiment are shown in Table 5 and the aspheric surface data are shown in Table 6 below.

TABLE 5

3rd Embodiment
f = 2.27 mm, Fno = 2.02, HFOV = 44.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.065 | | | | |
| 2 | Lens 1 | 1.508 | ASP | 0.200 | Plastic | 1.640 | 23.3 | −40.46 |
| 3 | | 1.351 | ASP | 0.050 | | | | |
| 4 | Lens 2 | 2.300 | ASP | 0.468 | Plastic | 1.544 | 55.9 | 1.63 |
| 5 | | −1.343 | ASP | 0.030 | | | | |
| 6 | Lens 3 | 19.426 | ASP | 0.200 | Plastic | 1.640 | 23.3 | −3.81 |
| 7 | | 2.158 | ASP | 0.388 | | | | |
| 8 | Lens 4 | −0.771 | ASP | 0.390 | Plastic | 1.544 | 55.9 | 75.92 |
| 9 | | −0.891 | ASP | 0.030 | | | | |
| 10 | Lens 5 | 1.076 | ASP | 0.679 | Plastic | 1.535 | 55.7 | 10.70 |
| 11 | | 1.033 | ASP | 0.500 | | | | |
| 12 | IR-cut filter | Plano | | 0.300 | Glass | 1.517 | 64.2 | — |
| 13 | | Plano | | 0.233 | | | | |
| 14 | Image | Plano | | — | | | | |

Note:
Reference wavelength is 587.6 nm (d-line).

TABLE 6

Aspheric Coefficients

| Surface # | 2 | 3 | 4 | 5 | 6 |
|---|---|---|---|---|---|
| k= | −5.8377E+00 | −3.1534E+00 | −1.5382E+01 | −9.0417E+00 | −9.0000E+01 |
| A4= | 7.3461E−04 | 1.3710E−02 | 1.8762E−01 | −2.1294E−01 | −2.5875E−01 |
| A6= | −2.3093E−01 | −6.5803E−02 | 1.4731E−01 | −2.8078E+00 | 3.7264E−02 |
| A8= | −1.7897E+00 | −2.1288E+00 | −1.3659E+00 | 2.7912E+01 | 2.9814E−01 |
| A10= | 4.4797E+00 | 2.1255E+00 | 1.6179E+00 | −1.2866E+02 | −2.1074E+00 |
| A12= | −5.8941E+00 | −1.6654E+00 | 1.3747E+00 | 3.1989E+02 | 5.9858E+00 |
| A14= | | | −3.0894E+00 | −3.8998E+02 | −5.1797E+00 |
| A16= | | | | 1.8214E+02 | 7.7023E−11 |

| Surface # | 7 | 8 | 9 | 10 | 11 |
|---|---|---|---|---|---|
| k= | −1.0470E+01 | −8.0684E+00 | −1.3915E+00 | −3.7564E+00 | −5.2932E+00 |
| A4= | −1.5168E−01 | −5.5144E−01 | 3.6097E−01 | −2.9955E+01 | 4.7925E−02 |
| A6= | 2.3421E−01 | 1.2234E+00 | −3.9468E+00 | 1.3946E−01 | −2.6285E−01 |
| A8= | −1.0291E+00 | −6.8883E+00 | 1.5297E+01 | −2.0804E−01 | 2.6668E−01 |
| A10= | 2.3494E+00 | 2.1933E+01 | −3.6821E+01 | 4.8634E−01 | −1.3866E−01 |
| A12= | −2.2354E+00 | −2.7247E+01 | 5.3024E+01 | −4.9828E−01 | 3.9093E−02 |
| A14= | 6.7507E−01 | 1.2703E+01 | −3.8969E+01 | 2.3068E−01 | −5.5917E−03 |
| A16= | 1.0440E−09 | −1.1096E+00 | 1.1166E+01 | −4.0798E−02 | 3.0524E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.27 | TL/R2 | 2.57 |
| Fno | 2.02 | (R5 + R6)/(R5 − R6) | 1.25 |
| HFOV [deg.] | 44.5 | R8/f | −0.39 |
| CT2/CT4 | 1.20 | f5/R10 | 10.35 |
| T45/T34 | 0.08 | f2/|f1| | 0.04 |
| Sd/Td | 0.97 | f/f2 | 1.39 |
| TL/Yc52 | 2.71 | 1/tan(HFOV) | 1.02 |

4th Embodiment

Figure 7:
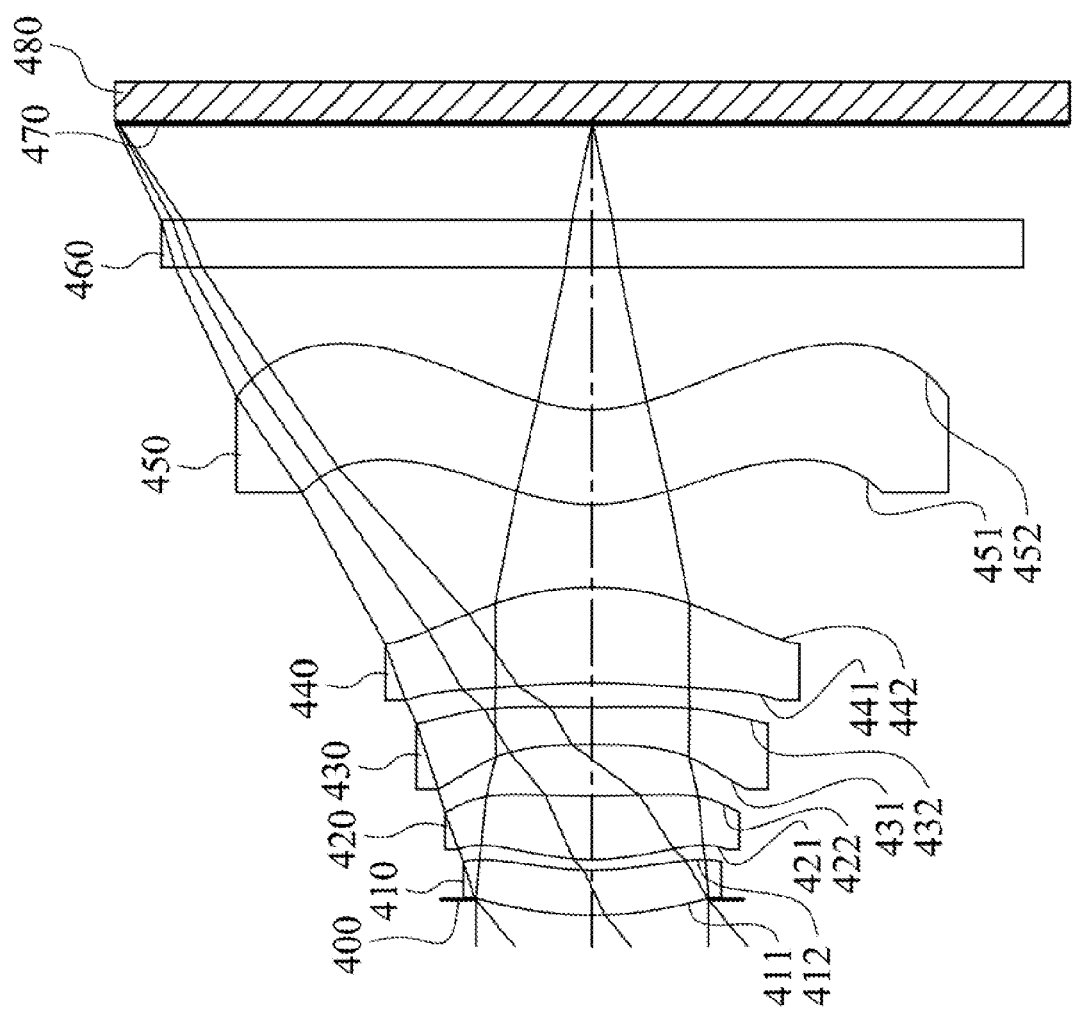
FIG. 7 is a schematic view of an image capturing device according to the 4th embodiment of the present disclosure.
Figure 8:
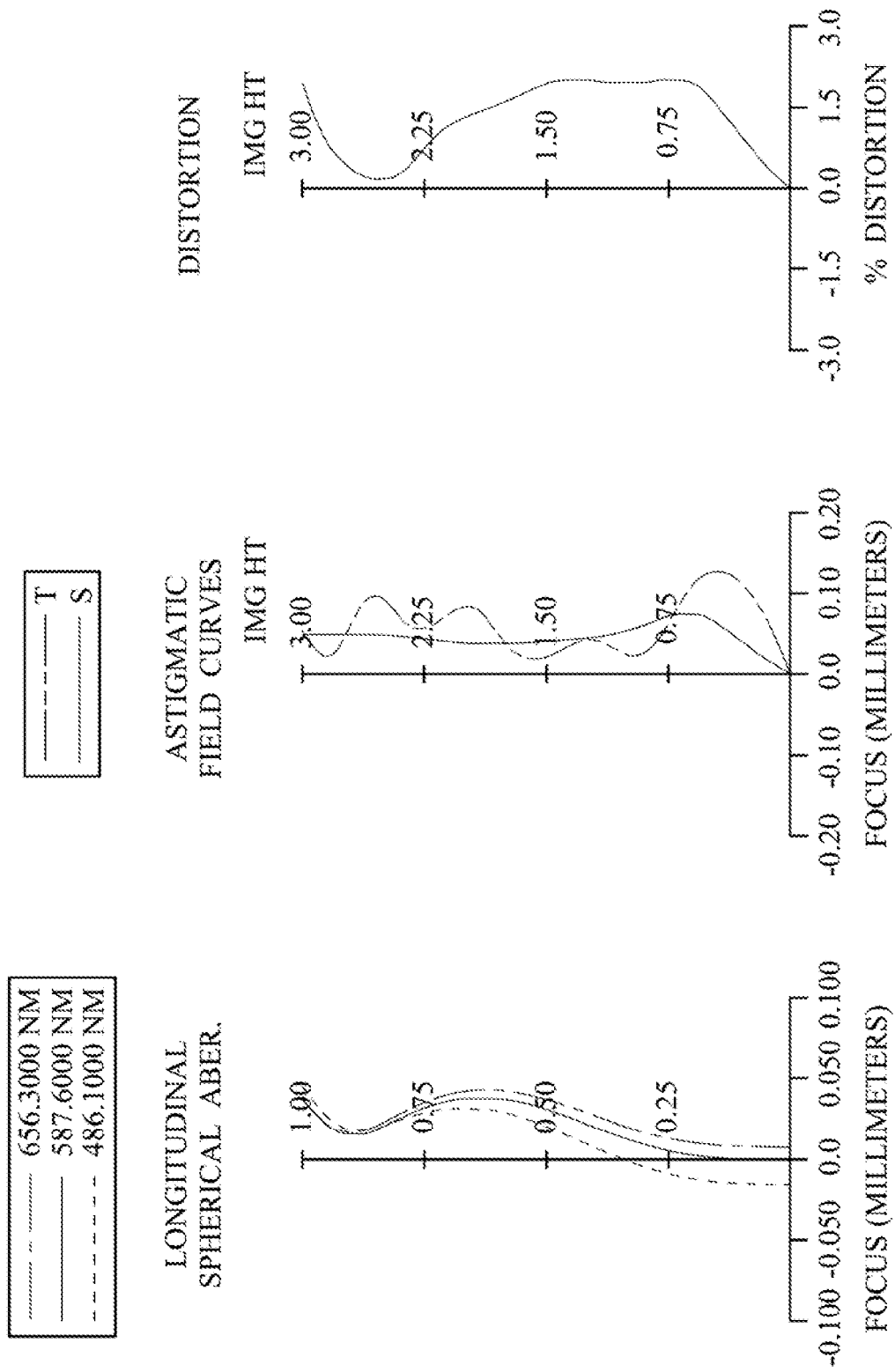
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves and a distortion curve of the image capturing device according to the 4th embodiment. In FIG. 7, the image capturing device includes the image capturing optical lens assembly (not otherwise herein labeled) of the present disclosure and an image sensor 480. The image capturing optical lens assembly includes, in order from an object side to an image side, an aperture stop 400, a first lens element 410, a second lens element 420, a third lens element 430, a fourth lens element 440, a fifth lens element 450, an IR-cut filter 460 and an image plane 470, wherein the image capturing optical lens assembly has a total of five lens elements (410-450) with refractive power.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of plastic material, and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with positive refractive power has an object-side surface 451 being convex in a paraxial region thereof and an image-side surface 452 being, concave in a paraxial region thereof, wherein the image-side surface 452 of the fifth lens element 450 has at least one convex shape in an off-axis region thereof. The fifth lens element 450 is made of plastic material and has the object-side surface 451 and the image-side surface 452 being both aspheric. Moreover, the refractive power of the fifth lens element 450 changes from positive at a paraxial region to negative at an off-axis region of the fifth lens element 450.

The IR-cut filter 460 is made of glass and located between the fifth lens element 450 and the image plane 470, and will not affect the focal length of the image capturing optical lens assembly. The image sensor 480 is disposed on or near the image plane 470 of the image capturing optical lens assembly.

The detailed optical data of the 4th embodiment are shown in Table 7 and the aspheric surface data are shown in Table 8 below.

TABLE 7

4th Embodiment
f = 3.56 mm, Fno = 2.42, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.098 | | | | |
| 2 | Lens 1 | 2.289 | ASP | 0.285 | Plastic | 1.544 | 55.9 | −17.90 |
| 3 | | 1.772 | ASP | 0.067 | | | | |
| 4 | Lens 2 | 1.478 | ASP | 0.401 | Plastic | 1.544 | 55.9 | 3.39 |
| 5 | | 6.702 | ASP | 0.323 | | | | |
| 6 | Lens 3 | −5.158 | ASP | 0.240 | Plastic | 1.639 | 23.5 | −5.72 |
| 7 | | 12.801 | ASP | 0.153 | | | | |
| 8 | Lens 4 | −4.733 | ASP | 0.604 | Plastic | 1.544 | 55.9 | 6.42 |
| 9 | | −2.101 | ASP | 0.521 | | | | |
| 10 | Lens 5 | 1.132 | ASP | 0.600 | Plastic | 1.535 | 55.7 | 15.36 |
| 11 | | 1.071 | ASP | 0.900 | | | | |
| 12 | IR-cut filter | Plano | | 0.300 | Glass | 1.517 | 64.2 | — |
| 13 | | Plano | | 0.615 | | | | |
| 14 | Image | Plano | | — | | | | |

Note:
Reference wavelength is 587.6 nm (d-line).

TABLE 8

Aspheric Coefficients

| Surface # | 2 | 3 | 4 | 5 | 6 |
|---|---|---|---|---|---|
| k= | −1.3083E+01 | −2.0000E+01 | −8.6325E+00 | 1.0088E+00 | 9.5494E+00 |
| A4= | 4.6441E−02 | −7.3194E−02 | −8.2808E−02 | −1.1859E−01 | −2.8602E−01 |
| A6= | 1.3443E−01 | −8.4745E−02 | −1.0540E−01 | −1.4847E−01 | −1.8647E−01 |
| A8= | −7.0062E−01 | 2.0470E−01 | 2.1289E−01 | 1.1349E−01 | 4.5884E−01 |
| A10= | 1.5726E+00 | −7.6975E−01 | −8.5230E−01 | −4.6438E−01 | −6.7174E−01 |
| A12= | −2.1124E+00 | 8.8371E−01 | 7.4656E−01 | 5.6477E−01 | 1.1314E+00 |
| A14= | 1.5344E+00 | −2.9896E−01 | −3.4389E−01 | −2.1888E−01 | −8.2452E−01 |
| A16= | −5.5299E−01 | −1.0450E−01 | 2.1420E−41 | 6.2591E−02 | 2.0061E−01 |

| Surface # | 7 | 8 | 9 | 10 | 11 |
|---|---|---|---|---|---|
| k= | −2.0000E+01 | −2.0000E+01 | −4.3786E−02 | −7.5583E+00 | −3.1284E+00 |
| A4= | −2.0002E−01 | −1.1430E−02 | −1.4218E−01 | 1.5610E−01 | −1.1866E−02 |
| A6= | 2.4481E−01 | 3.8696E−01 | 2.0279E−01 | −3.7118E−01 | −7.8160E−02 |
| A8= | −5.3743E−01 | −9.0796E−01 | −7.8423E−02 | 3.4311E−01 | 6.7060E−02 |
| A10= | 7.1274E−01 | 1.0305E+00 | 3.6860E−03 | −1.8372E−01 | −2.8395E−02 |
| A12= | −4.5116E−01 | −6.4762E−01 | 1.3264E−02 | 5.7823E−02 | 6.5782E−03 |
| A14= | 1.1216E−01 | 1.9075E−01 | −1.0190E−02 | −9.8314E−03 | −7.9894E−04 |
| A16= | 6.7372E−04 | −1.4670E−02 | 2.9318E−03 | 7.0149E−04 | 3.9709E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.56 | TL/R2 | 2.83 |
| Fno | 2.42 | (R5 + R6)/(R5 − R6) | −0.43 |
| HFOV [deg.] | 39.5 | R8/f | −0.59 |
| CT2/CT4 | 0.66 | f5/R10 | 14.35 |
| T45/T34 | 3.41 | f2/|f1| | 0.19 |
| Sd/Td | 0.97 | f/f2 | 1.05 |
| TL/Yc52 | 3.17 | 1/tan(HFOV) | 1.21 |

5th Embodiment

Figure 9:
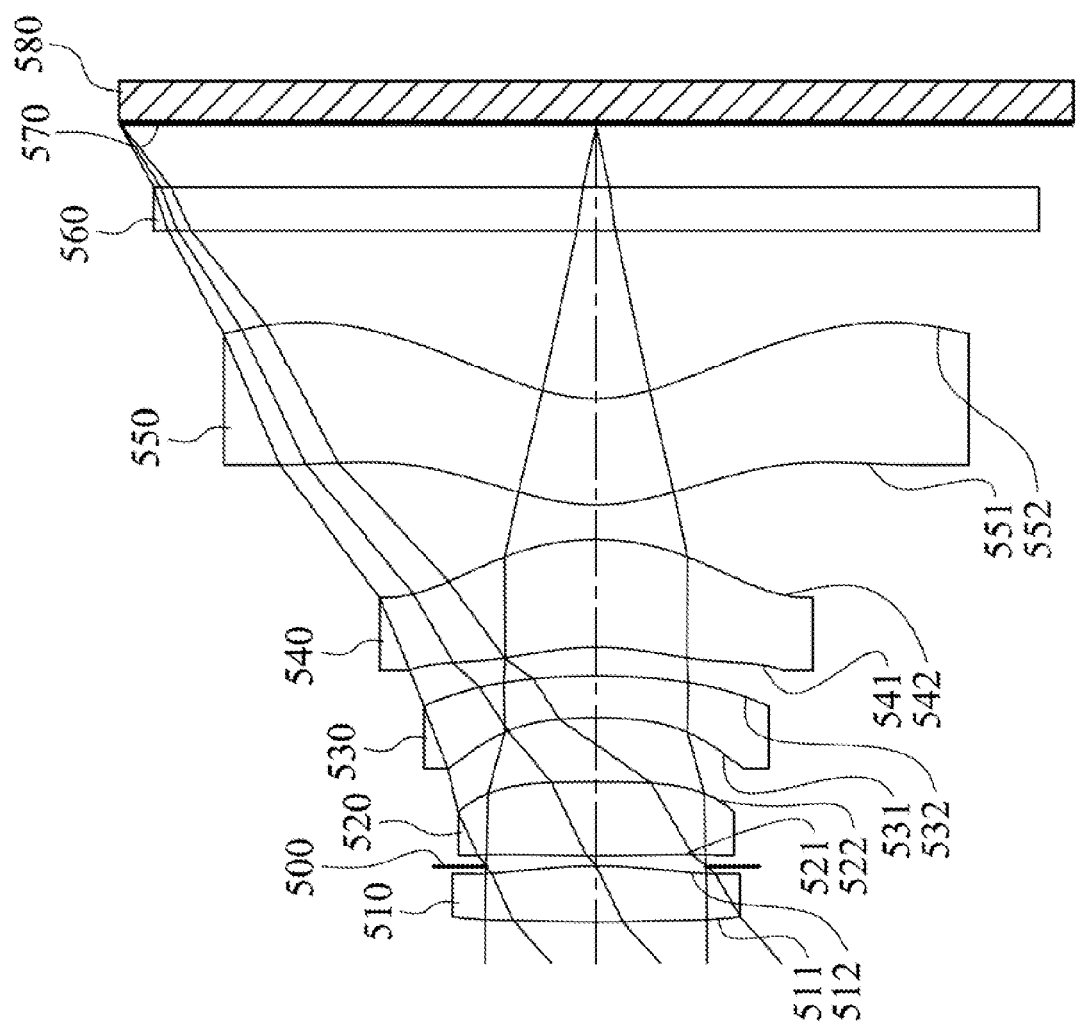
FIG. 9 is a schematic view of an image capturing device according to the 5th embodiment of the present disclosure.
Figure 10:
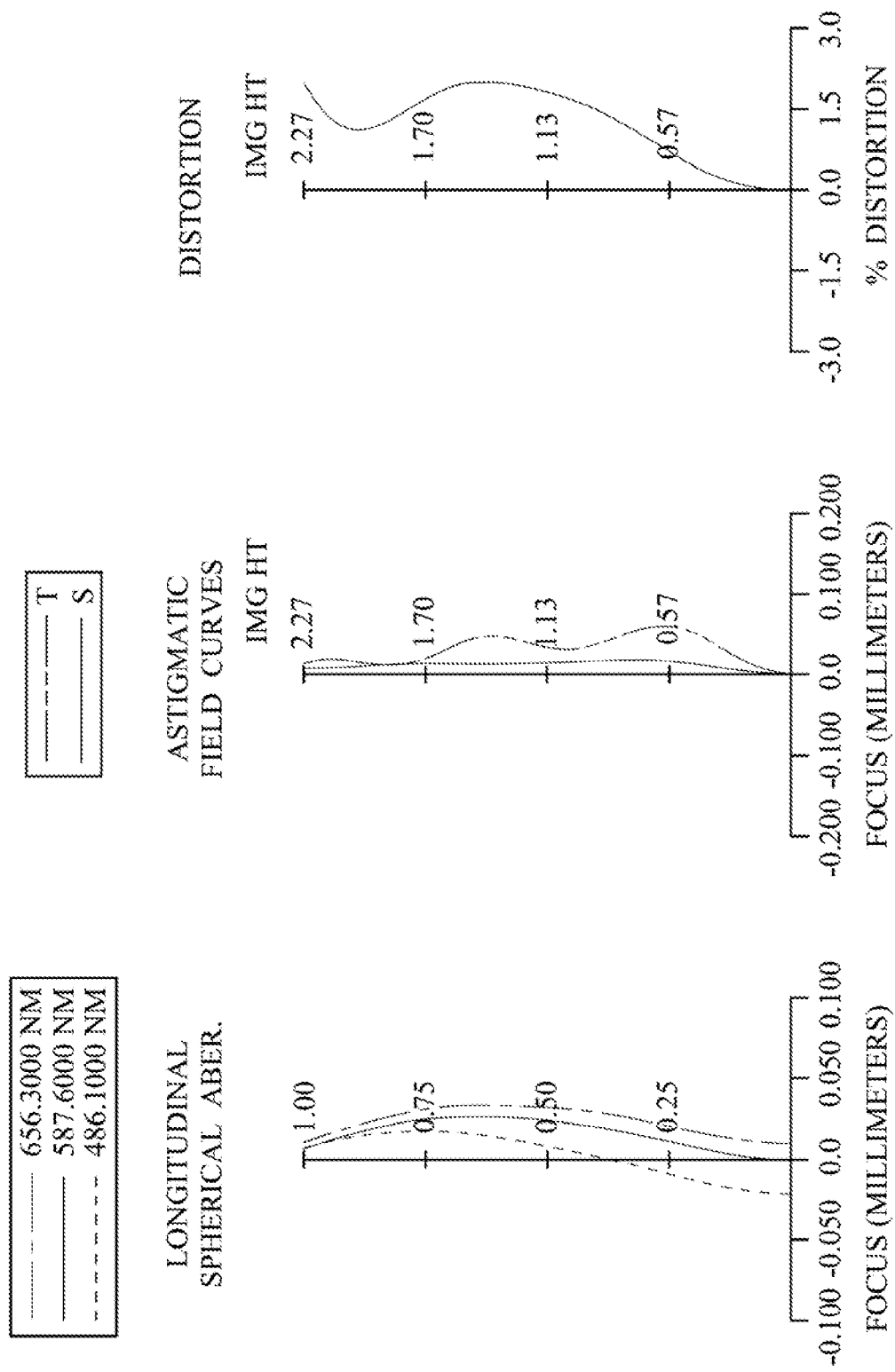
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows, in order from left to right, spherical aberration curves, astigmatic field curves and a distortion curve of the image capturing device according to the 5th embodiment. In FIG. 9, the image capturing device includes the image capturing optical lens assembly (not otherwise herein labeled) of the present disclosure and an image sensor 580. The image capturing optical lens assembly includes, in order from an object side to an image side, a first lens element 510, an aperture stop 500, a second lens element 520, a third lens element 530, a fourth lens element 540, a fifth lens element 550, an IR-cut filter 560 and an image plane 570, wherein the image capturing optical lens assembly has a total of five lens elements (510-550) with refractive power.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with positive refractive power has an object-side surface 551 being convex in a paraxial region thereof and an image-side surface 552 being concave in a paraxial region thereof, wherein the image-side surface 552 of the fifth lens element 550 has at least one convex shape in an off-axis region thereof. The fifth lens element 550 is made of plastic material and has the object-side surface 551 and the image-side surface 552 being both aspheric. Moreover, the refractive power of the fifth lens element 550 changes from positive at a paraxial region to negative at an off-axis region of the fifth lens element 550.

The IR-cut filter 560 is made of glass and located between the fifth lens element 550 and the image plane 570, and will not affect the focal length of the image capturing optical lens assembly. The image sensor 580 is disposed on or near the image plane 570 of the image capturing optical lens assembly.

The detailed optical data of the 5th embodiment are shown in Table 9 and the aspheric surface data are shown in Table 10 below.

TABLE 9

5th Embodiment
f = 2.51 mm, Fno = 2.38, HFOV = 41.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.779 | ASP | 0.265 | Plastic | 1.544 | 55.9 | 3.87 |
| 2 | | −2.852 | ASP | 0.000 | | | | |
| 3 | Ape. Stop | Plano | | 0.050 | | | | |
| 4 | Lens 2 | 15.949 | ASP | 0.349 | Plastic | 1.544 | 55.9 | 11.68 |
| 5 | | −10.481 | ASP | 0.307 | | | | |
| 6 | Lens 3 | −2.188 | ASP | 0.200 | Plastic | 1.650 | 21.4 | −12.55 |
| 7 | | −3.099 | ASP | 0.133 | | | | |
| 8 | Lens 4 | −1.326 | ASP | 0.515 | Plastic | 1.544 | 55.9 | 11.07 |
| 9 | | −1.235 | ASP | 0.162 | | | | |
| 10 | Lens 5 | 0.911 | ASP | 0.506 | Plastic | 1.535 | 55.7 | 19.02 |
| 11 | | 0.807 | ASP | 0.800 | | | | |
| 12 | IR-cut filter | Plano | | 0.210 | Glass | 1.517 | 64.2 | — |
| 13 | | Plano | | 0.305 | | | | |
| 14 | Image | Plano | | — | | | | |

Note:
Reference wavelength is 587.6 nm (d-line).

TABLE 10

Aspheric Coefficients

| Surface # | 1 | 2 | 4 | 5 | 6 |
|---|---|---|---|---|---|
| k= | 2.6387E+01 | −6.0994E+00 | −2.0000E+01 | −2.0000E+01 | 6.2564E+00 |
| A4= | −1.6290E−01 | −5.3198E−03 | −6.4074E−02 | −5.2270E−01 | −5.1579E−01 |
| A6= | 4.3676E−01 | 4.2746E−01 | 4.3424E−01 | −2.5881E−01 | −1.0120E+00 |
| A8= | −2.8716E+00 | 1.3356E+00 | −5.8400E−01 | 6.9108E−01 | 3.1399E+00 |
| A10= | 1.6116E+01 | −1.0302E+01 | −8.0257E+00 | −5.0213E+00 | −6.7210E+00 |
| A12= | −4.4641E+01 | 2.9550E+01 | 2.8429E+01 | 1.1842E+01 | 2.4503E+01 |
| A14= | 6.3982E+01 | −2.2166E+01 | −4.0899E+01 | −1.2005E+01 | −3.5358E+01 |
| A16= | −3.6719E+01 | −6.9390E+00 | 1.4223E+01 | 2.0781E+00 | 1.7948E+01 |

| Surface # | 7 | 8 | 9 | 10 | 11 |
|---|---|---|---|---|---|
| k= | 8.5914E−01 | −3.0218E+00 | 7.4024E−03 | −3.6289E+00 | −2.0669E+00 |
| A4= | −5.1950E−02 | 4.1714E−01 | −2.3934E−01 | −3.1398E−01 | −3.1044E−01 |
| A6= | 6.4570E−01 | 1.3601E+00 | 9.0475E−01 | 3.2812E−01 | 2.6012E−01 |
| A8= | −3.9070E+00 | −6.8153E+00 | −6.2498E−01 | −3.0533E−01 | −1.6582E−01 |
| A10= | 8.7331E+00 | 1.2970E+01 | 9.2376E−02 | 1.9197E−01 | 7.1397E−02 |
| A12= | −9.5658E+00 | −1.3520E+01 | 3.5387E−01 | −7.0495E−02 | −1.9708E−02 |
| A14= | 4.8470E+00 | 7.4613E+00 | −3.7327E−01 | 1.4033E−02 | 3.1616E−03 |
| A16= | −5.3548E−01 | −1.7935E+00 | 1.2150E−01 | −1.2023E−03 | −2.2228E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.51 | TL/R2 | −1.33 |
| Fno | 2.38 | (R5 + R6)/(R5 − R6) | −5.81 |
| HFOV [deg.] | 41.3 | R8/f | −0.49 |
| CT2/CT4 | 0.68 | f5/R10 | 23.57 |
| T45/T34 | 1.22 | f2/|f1| | 3.02 |
| Sd/Td | 0.89 | f/f2 | 0.21 |
| TL/Yc52 | 2.76 | 1/tan(HFOV) | 1.14 |

6th Embodiment

Figure 11:
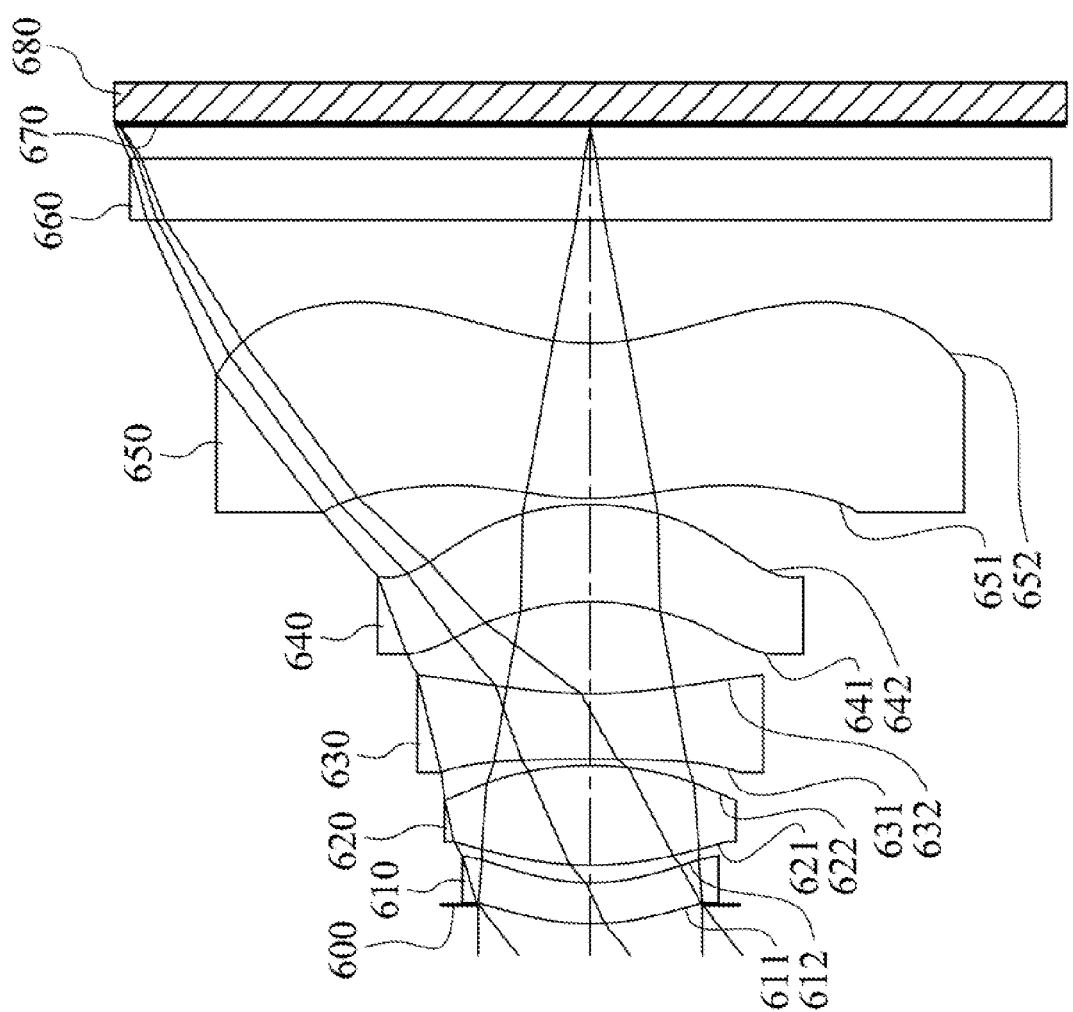
FIG. 11 is a schematic view of an image capturing device according to the 6th embodiment of the present disclosure.
Figure 12:
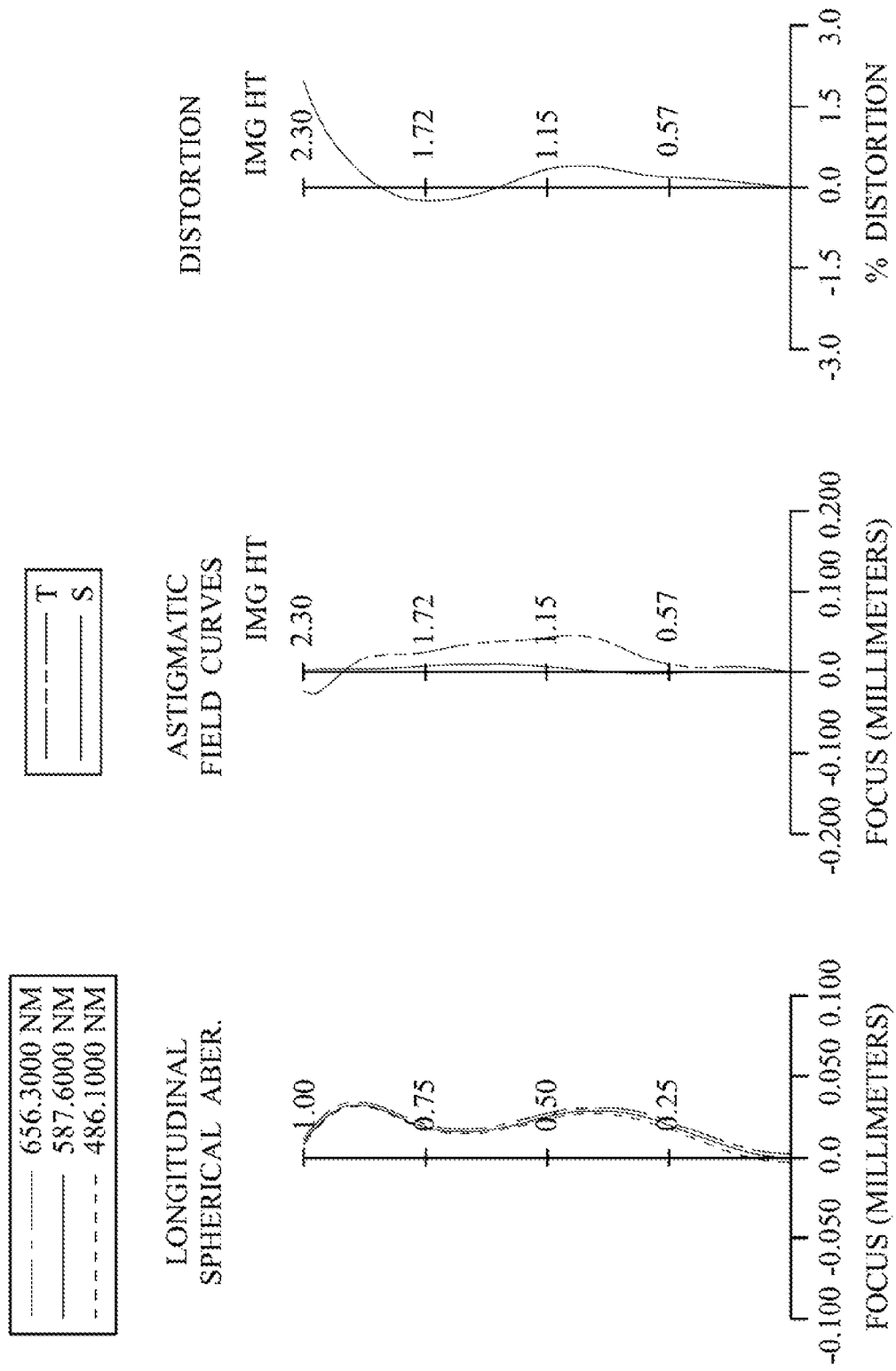
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves and a distortion curve of the image capturing device according to the 6th embodiment. In FIG. 11, the image capturing device includes the image capturing optical lens assembly (not otherwise herein labeled) of the present disclosure and an image sensor 680. The image capturing optical lens assembly includes, in order from an object side to an image side, an aperture stop 600, a first lens element 610, a second lens element 620, a third lens element 630, a fourth lens element 640, a fifth lens element 650, an IR-cut filter 660 and an image plane 670, wherein the image capturing optical lens assembly has a total of five lens elements (610-650) with refractive power.

The first lens element 610 with negative refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with positive refractive power has an object-side surface 651 being convex in a paraxial region thereof and an image-side surface 652 being concave in a paraxial region thereof, wherein the image-side surface 652 of the fifth lens element 650 has at least one convex shape in an off-axis region thereof. The fifth lens element 650 is made of plastic material and has the object-side surface 651 and the image-side surface 652 being both aspheric. Moreover, the refractive power of the fifth lens element 650 changes from positive at a paraxial region to negative at an off-axis region of the fifth lens element 650.

The IR-cut filter 660 is made of glass and located between the fifth lens element 650 and the image plane 670, and will not affect the focal length of the image capturing optical lens assembly. The image sensor 680 is disposed on or near the image plane 670 of the image capturing optical lens assembly.

The detailed optical data of the 6th embodiment are shown in Table 11 and the aspheric surface data are shown in Table 12 below.

TABLE 11

6th Embodiment
f = 2.87 mm, Fno = 2.63, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.092 | | | | |
| 2 | Lens 1 | 1.201 | ASP | 0.200 | Plastic | 1.544 | 55.9 | −21.42 |
| 3 | | 1.025 | ASP | 0.086 | | | | |
| 4 | Lens 2 | 1.699 | ASP | 0.483 | Plastic | 1.544 | 55.9 | 1.56 |
| 5 | | −1.524 | ASP | 0.030 | | | | |
| 6 | Lens 3 | −20.487 | ASP | 0.322 | Plastic | 1.640 | 23.3 | −3.18 |
| 7 | | 2.276 | ASP | 0.449 | | | | |
| 8 | Lens 4 | −1.081 | ASP | 0.469 | Plastic | 1.544 | 55.9 | −42.81 |
| 9 | | −1.307 | ASP | 0.030 | | | | |
| 10 | Lens 5 | 1.354 | ASP | 0.759 | Plastic | 1.535 | 55.7 | 52.44 |
| 11 | | 1.145 | ASP | 0.600 | | | | |
| 12 | IR-cut filter | Plano | | 0.300 | Glass | 1.517 | 64.2 | — |
| 13 | | Plano | | 0.167 | | | | |
| 14 | Image | Plano | | — | | | | |

Note:
Reference wavelength is 587.6 nm (d-line).

TABLE 12

Aspheric Coefficients

| Surface # | 2 | 3 | 4 | 5 | 6 |
|---|---|---|---|---|---|
| k= | −4.0830E+00 | −3.1534E+00 | −9.9473E+00 | −5.8764E+00 | 1.0000E+00 |
| A4= | 2.4356E−02 | 1.0301E−02 | 1.4152E−01 | −1.0210E−01 | −1.8494E−01 |
| A6= | −1.9231E−01 | −2.1414E−01 | −2.0542E−02 | −1.7556E+00 | 9.3220E−02 |
| A8= | −1.1101E+00 | −1.0913E+00 | −8.4305E−01 | 1.4002E+01 | 2.2743E−01 |
| A10= | 1.8998E+00 | 6.4606E−01 | 9.8372E−01 | −5.4451E+01 | −1.4717E+00 |
| A12= | −2.0658E+00 | −5.8373E−01 | 4.8181E−01 | 1.1212E+02 | 2.0980E+00 |
| A14= | | | −8.9488E−01 | −1.1296E+02 | −1.5004E+00 |
| A16= | | | | 4.3603E+01 | 1.9616E−11 |

| Surface # | 7 | 8 | 9 | 10 | 11 |
|---|---|---|---|---|---|
| k= | −7.0093E+00 | −1.1625E+01 | −1.2147E+00 | −1.0184E+01 | −5.3590E+00 |
| A4= | −1.1706E−01 | −2.9105E−01 | −1.2575E−01 | −3.0937E−01 | −9.2889E−02 |
| A6= | 1.4856E−01 | −9.4410E−01 | −8.2834E−01 | 8.0404E−02 | −3.2109E−02 |
| A8= | −5.1237E−01 | 5.9032E+00 | 3.6159E+00 | 1.9724E−01 | 6.4139E−02 |
| A10= | 9.8099E−01 | −1.7268E+01 | −7.2782E+00 | −2.4653E−01 | −4.0264E−02 |
| A12= | −7.8351E−01 | 2.9474E+01 | 8.5682E+00 | 1.3450E−01 | 1.2846E−02 |
| A14= | 1.9554E−01 | −2.4970E+01 | −5.0974E+00 | −3.8603E−02 | −2.0893E−03 |
| A16= | 2.4874E−10 | 8.0482E+00 | 1.1659E+00 | 4.5253E−03 | 1.3046E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.87 | TL/R2 | 3.80 |
| Fno | 2.63 | (R5 + R6)/(R5 − R6) | 0.80 |
| HFOV [deg.] | 38.0 | R8/f | −0.46 |
| CT2/CT4 | 1.03 | f5/R10 | 45.79 |
| T45/T34 | 0.07 | f2/|f1| | 0.07 |
| Sd/Td | 0.97 | f/f2 | 1.84 |
| TL/Yc52 | 3.45 | 1/tan(HFOV) | 1.28 |

7th Embodiment

Figure 13:
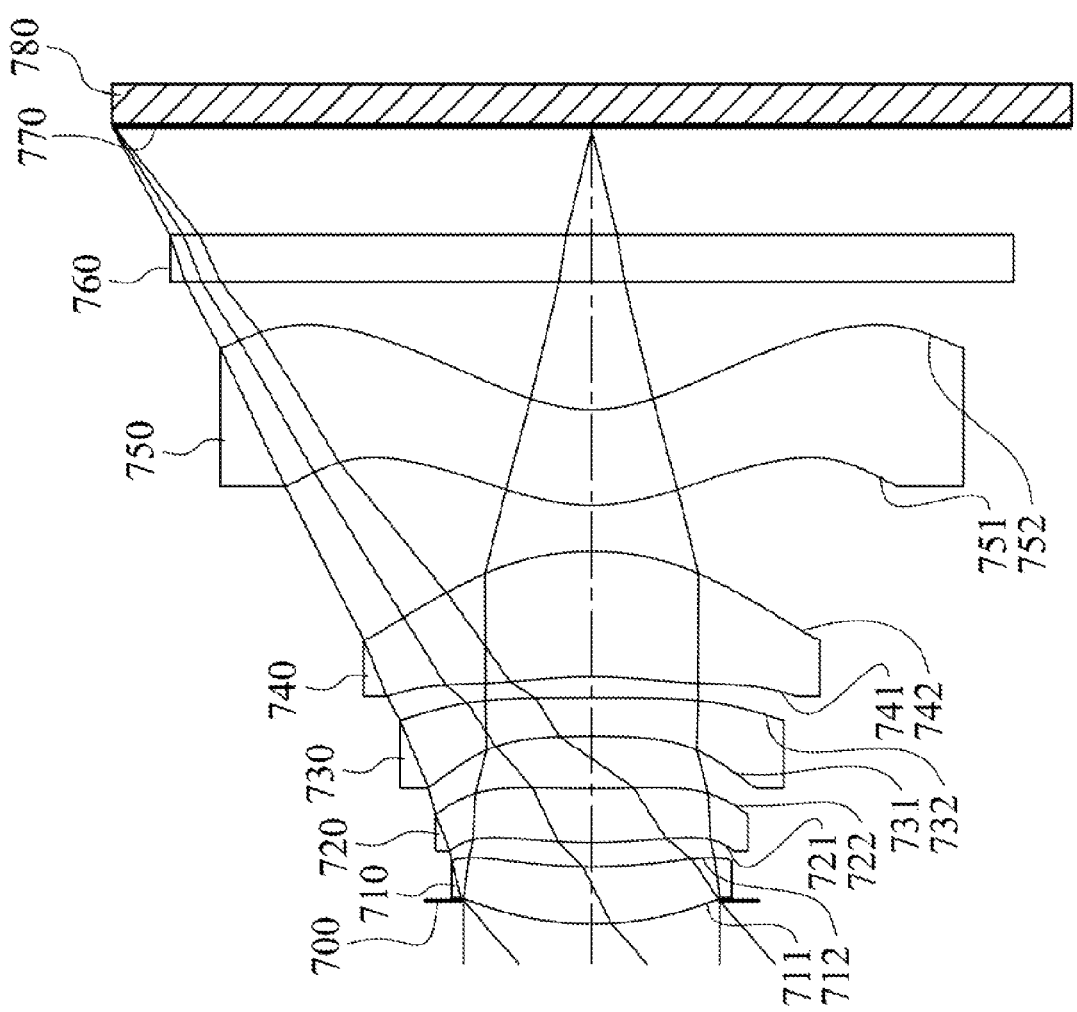
FIG. 13 is a schematic view of an image capturing device according to the 7th embodiment of the present disclosure.
Figure 14:
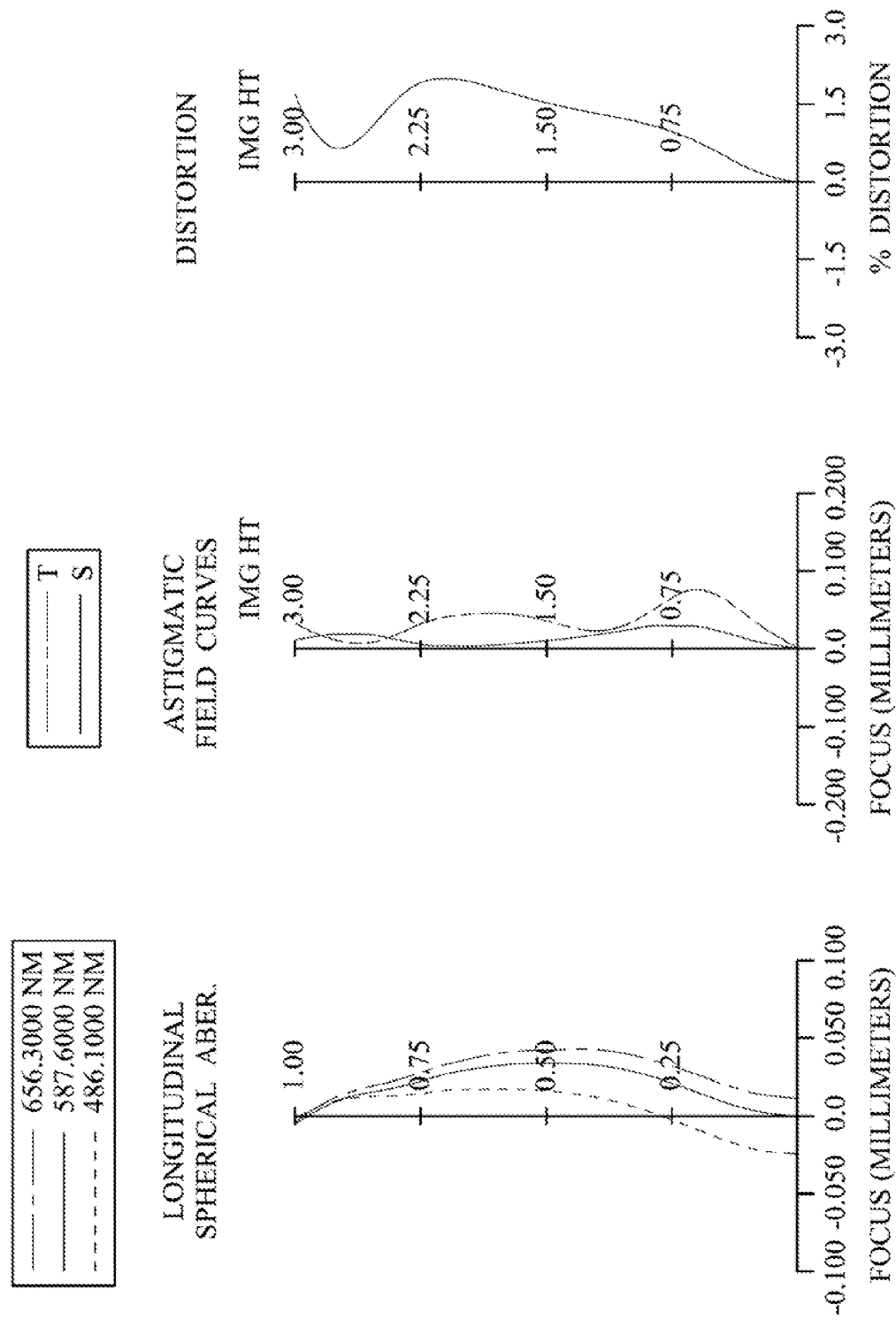
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows, in order from left to right, spherical aberration curves, astigmatic field curves and a distortion curve of the image capturing device according to the 7th embodiment. In FIG. 13, the image capturing device includes the image capturing optical lens assembly (not otherwise herein labeled) of the present disclosure and an image sensor 780. The image capturing optical lens assembly includes, in order from an object side to an image side, an aperture stop 700, a first lens element 710, a second lens element 720, a third lens element 730, a fourth lens element 740, a fifth lens element 750, an IR-cut filter 760 and an image plane 770, wherein the image capturing optical lens assembly has a total of five lens elements (710-750) with refractive power.

The first lens element 710 with positive refractive power has an object-side surface 711 being convex in a paraxial region thereof and an image-side surface 712 being concave in a paraxial region thereof. The first lens element 710 is made of glass material and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with positive refractive power has an object-side surface 751 being convex in a paraxial region thereof and an image-side surface 752 being concave in a paraxial region thereof, wherein the image-side surface 752 of the fifth lens element 750 has at least one convex shape in an off-axis region thereof. The fifth lens element 750 is made of plastic material and has the object-side surface 751 and the image-side surface 752 being both aspheric. Moreover, the refractive power of the fifth lens element 750 changes from positive at a paraxial region to negative at an off-axis region of the fifth lens element 750.

The IR-cut filter 760 is made of glass and located between the fifth lens element 750 and the image plane 770, and will not affect the focal length of the image capturing optical lens assembly. The image sensor 780 is disposed on or near the image plane 770 of the image capturing optical lens assembly.

The detailed optical data of the 7th embodiment are shown in Table 13 and the aspheric surface data are shown in Table 14 below.

TABLE 13

7th Embodiment
f = 3.40 mm, Fno = 2.12, HFOV = 40.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.145 | | | | |
| 2 | Lens 1 | 2.042 | ASP | 0.358 | Glass | 1.542 | 62.9 | 9.82 |
| 3 | | 3.107 | ASP | 0.151 | | | | |
| 4 | Lens 2 | 3.263 | ASP | 0.337 | Plastic | 1.544 | 55.9 | 9.19 |
| 5 | | 9.058 | ASP | 0.330 | | | | |
| 6 | Lens 3 | −6.436 | ASP | 0.240 | Plastic | 1.639 | 23.5 | −10.76 |
| 7 | | −102.237 | ASP | 0.133 | | | | |
| 8 | Lens 4 | −3.033 | ASP | 0.786 | Plastic | 1.544 | 55.9 | 6.55 |
| 9 | | −1.789 | ASP | 0.284 | | | | |
| 10 | Lens 5 | 1.148 | ASP | 0.600 | Plastic | 1.535 | 55.7 | 33.01 |
| 11 | | 1.005 | ASP | 0.800 | | | | |
| 12 | IR-cut filter | Plano | | 0.300 | Glass | 1.517 | 64.2 | — |
| 13 | | Plano | | 0.682 | | | | |
| 14 | Image | Plano | | — | | | | |

Note:
Reference wavelength is 587.6 nm (d-line).

TABLE 14

Aspheric Coefficients

| Surface# | 2 | 3 | 4 | 5 | 6 |
|---|---|---|---|---|---|
| k= | −1.9279E+01 | −1.5290E+00 | 1.0000E+00 | −1.9975E+01 | −5.3220E+01 |
| A4= | −7.7783E−02 | −4.8219E−01 | −2.9345E−01 | −3.5167E−01 | −7.5073E−01 |
| A6= | −1.0279E+00 | −8.2134E−01 | −8.0467E−01 | −3.2704E+00 | −2.6760E−01 |
| A8= | 3.3431E+00 | −1.4642E+00 | −5.9450E+00 | 2.6889E+01 | 4.7539E−01 |
| A10= | −9.2796E+00 | 2.7774E+00 | 1.0354E+01 | −1.2814E+02 | −1.2689E+00 |
| A12= | −5.8941E+00 | −1.6654E+00 | 1.3747E+00 | 3.1989E+02 | 5.9837E+00 |
| A14= | 3.3383E−11 | 2.1612E−11 | −3.0894E+00 | −3.8998E+02 | −5.1797E+00 |
| A16= | 3.9887E−12 | 3.1665E−12 | −1.7388E−12 | 1.8214E+02 | 2.0127E−13 |

| Surface# | 7 | 8 | 9 | 10 | 11 |
|---|---|---|---|---|---|
| k= | −9.0000E+01 | −2.2436E+00 | −1.3580E+00 | −1.7989E+01 | −5.2932E+00 |
| A4= | −3.5543E−01 | −5.8688E−01 | 8.2889E−02 | 6.1296E−01 | 4.7925E−02 |
| AS= | 3.7727E−01 | 5.0585E+00 | 2.2661E−01 | −1.3601E+00 | −2.6285E−01 |
| A8= | −1.3865E+00 | −1.9797E+01 | −9.4389E−01 | 1.4047E+00 | 2.6668E−01 |
| A10= | 2.6887E+00 | 4.4535E+01 | −8.4399E−01 | −7.9088E−01 | −1.3866E−01 |
| A12= | −2.2353E+00 | −5.4711E+01 | 5.4078E+00 | 2.0313E−01 | 3.9093E−02 |
| A14= | 6.7481E−01 | 3.4631E+01 | −5.3097E+00 | 1.6846E−04 | −5.5917E−03 |
| A16= | −3.1189E−12 | −8.9304E+00 | 1.5615E+00 | −7.6132E−03 | 3.0524E−04 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 1 and Table 14 as the following values and satisfy the following conditions:

| 7th Embodiment | | | |
|---|---|---|---|
| f [mm] | 3.40 | TL/R2 | 1.61 |
| Fno | 2.12 | (R5 + R6)/(R5 − R6) | −1.13 |
| HFOV [deg.] | 40.8 | R8/f | −0.53 |
| CT2/CT4 | 0.43 | f5/R10 | 32.86 |
| T45/T34 | 2.14 | f2/|f1| | 0.94 |
| Sd/Td | 0.95 | f/f2 | 0.37 |
| TL/Yc52 | 2.80 | 1/tan(HFOV) | 1.16 |

8th Embodiment

Figure 15:
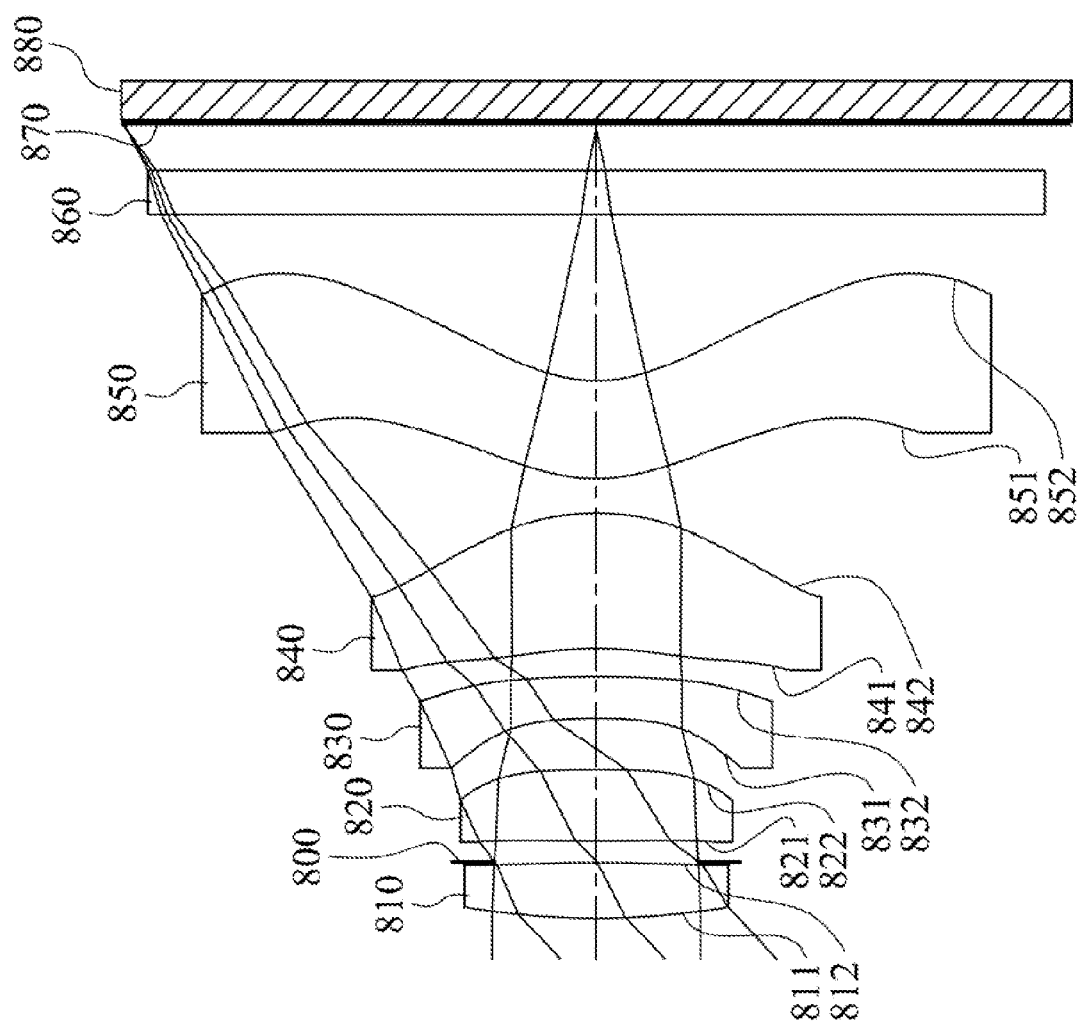
FIG. 15 is a schematic view of an image capturing device according to the 8th embodiment of the present disclosure.
Figure 16:
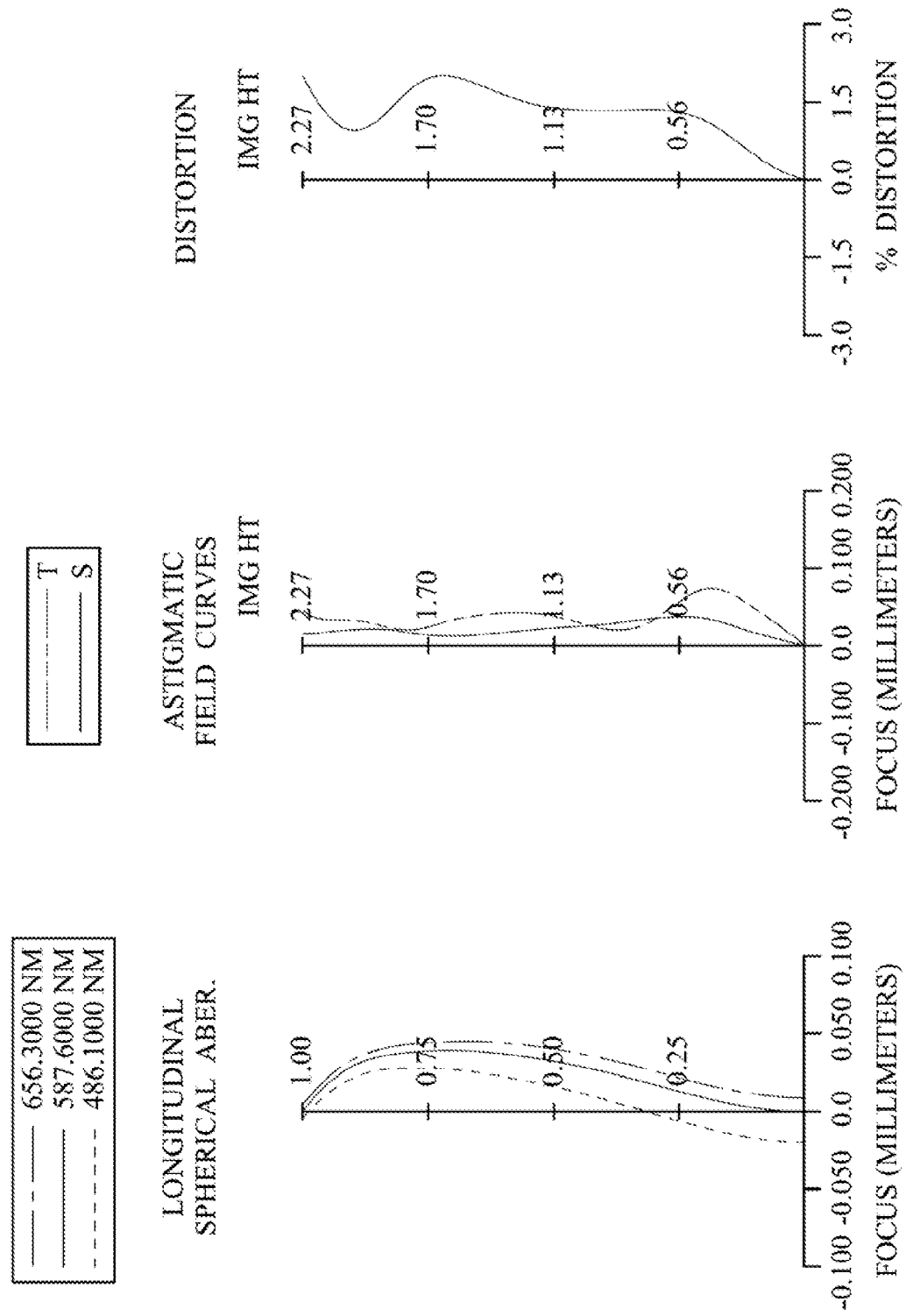
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows, in order from left to right, spherical aberration curves, astigmatic field curves and a distortion curve of the image capturing device according to the 8th embodiment. In FIG. 15, the image capturing device includes the image capturing optical lens assembly (not otherwise herein labeled) of the present disclosure and an image sensor 880. The image capturing optical lens assembly includes, in order from an object side to an image side, a first lens element 810, an aperture stop 800, a second lens element 820, a third lens element 830, a fourth lens element 840, a fifth lens element 850, an IR-cut filter 860 and an image plane 870, wherein the image capturing optical lens assembly has a total of five lens elements (810-850) with refractive power.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being convex in a paraxial region thereof. The second lens element 820 is made of plastic material and has the object-side surface 821 and the image-side surface 822 being both aspheric.

The third lens element 830 with negative refractive power has art object-side surface 831 being concave in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with positive refractive power has an object-side surface 851 being convex in a paraxial region thereof and an image-side surface 852 being concave in a paraxial region thereof, wherein the image-side surface 852 of the fifth lens element 850 has at least one convex shape in an off-axis region thereof. The fifth lens element 850 is made of plastic material and has the object-side surface 851 and the image-side surface 852 being both aspheric. Moreover, the refractive power of the fifth lens element 850 changes from positive at a paraxial region to negative at an off-axis region of the fifth lens element 850.

The IR-cut filter 860 is made of glass and located between the fifth lens element 850 and the image plane 870, and will not affect the focal length of the image capturing optical lens assembly. The image sensor 880 is disposed on or near the image plane 870 of the image capturing optical lens assembly.

The detailed optical data of the 8th embodiment are shown in Table 15, and the aspheric surface data are shown in Table 16 below.

TABLE 15

8th Embodiment
f = 2.37 mm, Fno = 2.38, HFOV = 42.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.383 | ASP | 0.266 | Plastic | 1.544 | 55.9 | 4.63 |
| 2 | | −9.587 | ASP | 0.005 | | | | |
| 3 | Ape. Stop | Plano | | 0.098 | | | | |
| 4 | Lens 2 | 14.954 | ASP | 0.339 | Plastic | 1.544 | 55.9 | 8.54 |
| 5 | | −6.685 | ASP | 0.248 | | | | |
| 6 | Lens 3 | −2.910 | ASP | 0.200 | Plastic | 1.639 | 23.5 | −9.52 |
| 7 | | −5.724 | ASP | 0.133 | | | | |
| 8 | Lens 4 | −1.633 | ASP | 0.647 | Plastic | 1.544 | 55.9 | 5.92 |
| 9 | | −1.235 | ASP | 0.168 | | | | |
| 10 | Lens 5 | 0.807 | ASP | 0.466 | Plastic | 1.535 | 55.7 | 28.91 |
| 11 | | 0.680 | ASP | 0.800 | | | | |
| 12 | IR-cut filter | Plano | | 0.210 | Glass | 1.517 | 64.2 | — |
| 13 | | Plano | | 0.232 | | | | |
| 14 | Image | Plano | | — | | | | |

Note:
Reference wavelength is 587.6 nm (d-line).

TABLE 16

Aspheric Coefficients

| Surface # | 1 | 2 | 4 | 5 | 6 |
|---|---|---|---|---|---|
| k= | −2.0000E+01 | −2.0000E+01 | 5.0000E+01 | 1.6192E+01 | 1.2933E+01 |
| A4= | −2.7329E−02 | −3.1093E−02 | −1.1187E−01 | −4.7102E−01 | −5.8833E−01 |
| A6= | 3.6983E−01 | 5.2314E−02 | −7.0253E−02 | −3.6515E−01 | −1.1431E+00 |
| A8= | −3.3588E+00 | 1.3722E+00 | 7.6147E−01 | 7.4113E−01 | 3.0586E+00 |
| A10= | 1.6350E+01 | −7.7021E+00 | −7.6540E+00 | −5.1105E+00 | −7.0121E+00 |
| A12= | −4.3217E+01 | 2.6027E+01 | 2.2140E+01 | 1.2180E+01 | 2.5151E+01 |
| A14= | 6.2157E+01 | −2.7983E+01 | −2.6867E+01 | −9.3783E+00 | −3.3297E+01 |
| A16= | −3.6719E+01 | −6.9390E+00 | 1.4223E+01 | 1.5105E+00 | 1.4665E+01 |

| Surface # | 7 | 8 | 9 | 10 | 11 |
|---|---|---|---|---|---|
| k= | −1.5115E+01 | −3.7042E+00 | 1.3121E−01 | −4.2490E+00 | −1.6125E+00 |
| A4= | −1.4365E−01 | 3.1477E−01 | −2.6360E−01 | −7.0370E−02 | −4.2661E−01 |
| A6= | 6.8941E−01 | 1.4080E+00 | 8.6391E−01 | −1.6049E−01 | 3.9905E−01 |
| A8= | −3.8592E+00 | −6.7517E+00 | −6.4193E−02 | 3.3650E−01 | −2.4135E−01 |
| A10= | 8.8097E+00 | 1.2904E+01 | 7.3572E−01 | −2.9795E−01 | 9.1766E−02 |
| A12= | −9.6441E+00 | −1.3650E+01 | 3.4653E−01 | 1.3192E−01 | −2.1875E−02 |
| A14= | 4.5400E+00 | 7.4571E+00 | −3.6413E−01 | −2.8639E−02 | 2.9866E−03 |
| A16= | −3.3932E−01 | −1.5265E+00 | 1.4748E−01 | 2.4388E−03 | −1.7620E−04 | in the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.37 | TL/R2 | 0.40 |
| Fno | 2.38 | (R5 + R6)/(R5 − R6) | 3.07 |
| HFOV [deg.] | 42.9 | R8/f | 0.52 |
| CT2/CT4 | 0.52 | f5/R10 | 42.49 |
| T45/T34 | 1.26 | f2/|f1| | 1.84 |
| Sd/Td | 0.89 | f/f2 | 0.28 |
| TL/Yc52 | 2.52 | 1/tan(HFOV) | 1.08 |

9th Embodiment

Figure 18:
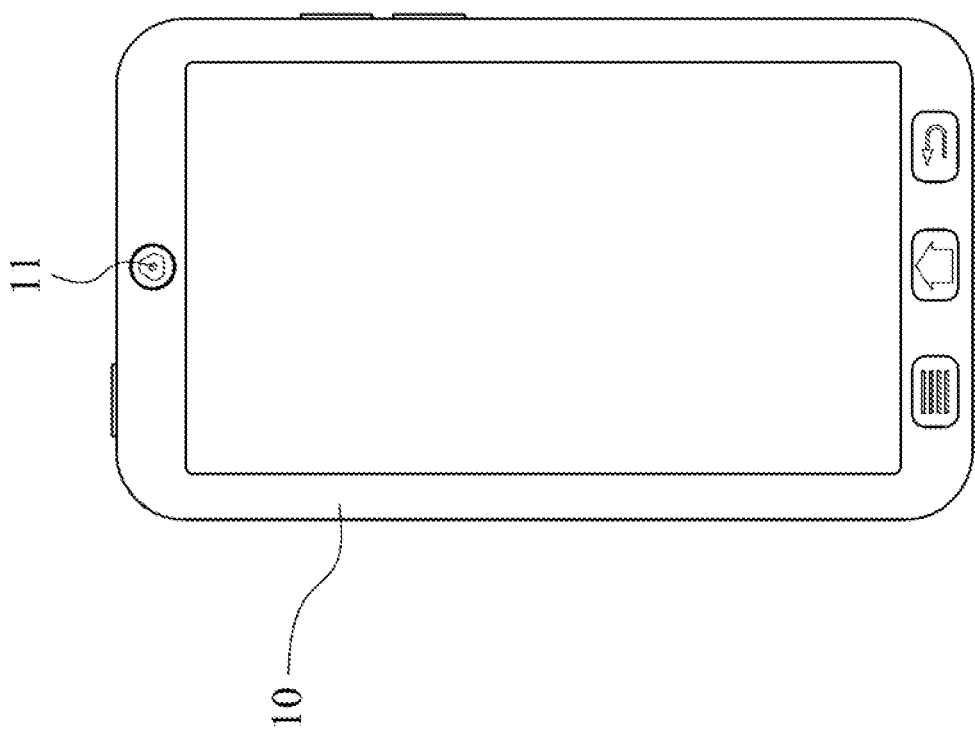
FIG. 18 shows a mobile terminal according to the 9th embodiment.

FIG. 18 is a schematic view of a mobile terminal 10 according to the 9th embodiment of the present disclosure. The mobile terminal 10 of the 9th embodiment is a smart phone, wherein the mobile terminal 10 includes an image capturing device 11. The image capturing device 11 includes an image capturing optical lens assembly (not otherwise herein labeled) according to the present disclosure and an image sensor (not otherwise herein labeled), wherein the image sensor is disposed on or near an image plane of the image capturing optical lens assembly.

10th Embodiment

Figure 19:
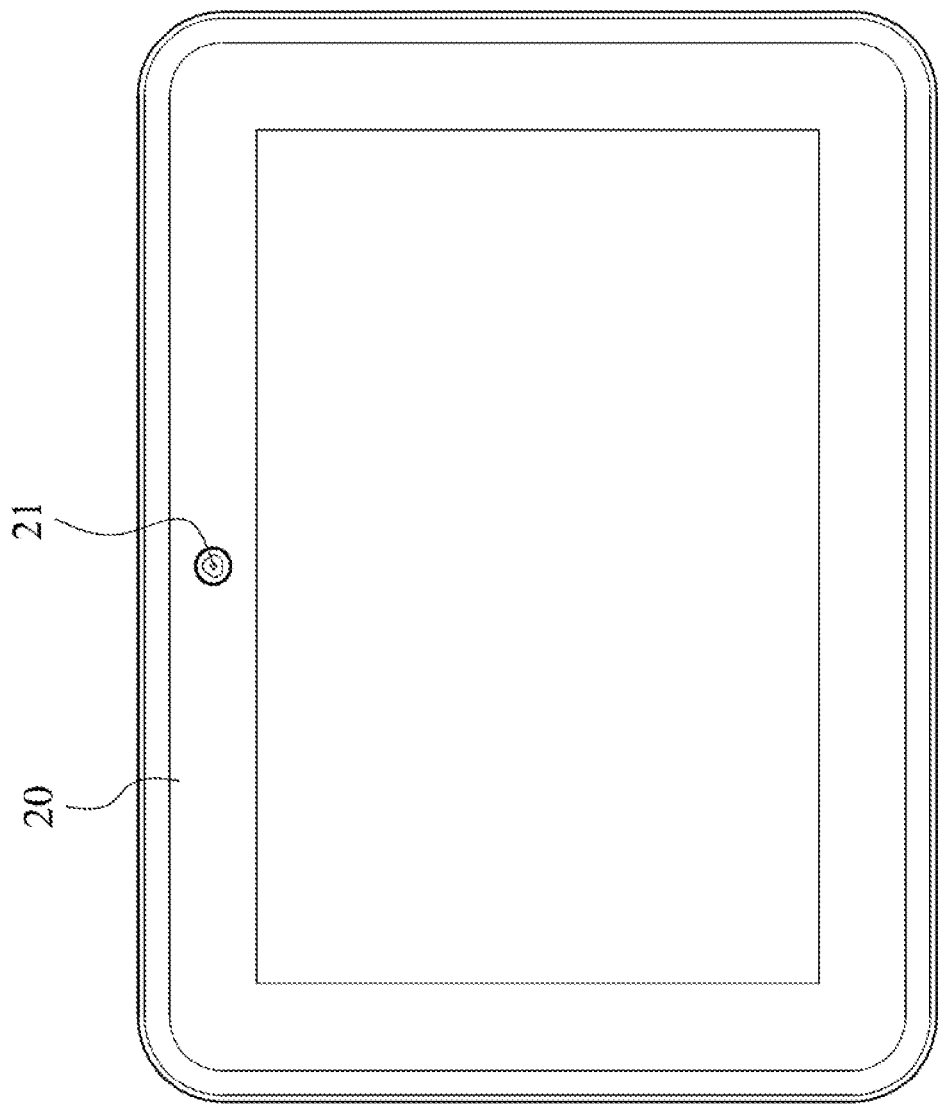
FIG. 19 shows a mobile terminal according to the 10th embodiment.

FIG. 19 is a schematic view of a mobile terminal 20 according to the 10th embodiment of the present disclosure. The mobile terminal 20 of the 10th embodiment is a tablet personal computer, wherein the mobile terminal 20 includes an image capturing device 21. The image capturing device 21 includes an image capturing optical lens assembly (not otherwise herein labeled) qtr according to the present disclosure and an image sensor not otherwise herein labeled), wherein the image sensor is disposed on or near an image plane of the image capturing optical lens assembly.

11th Embodiment

Figure 20:
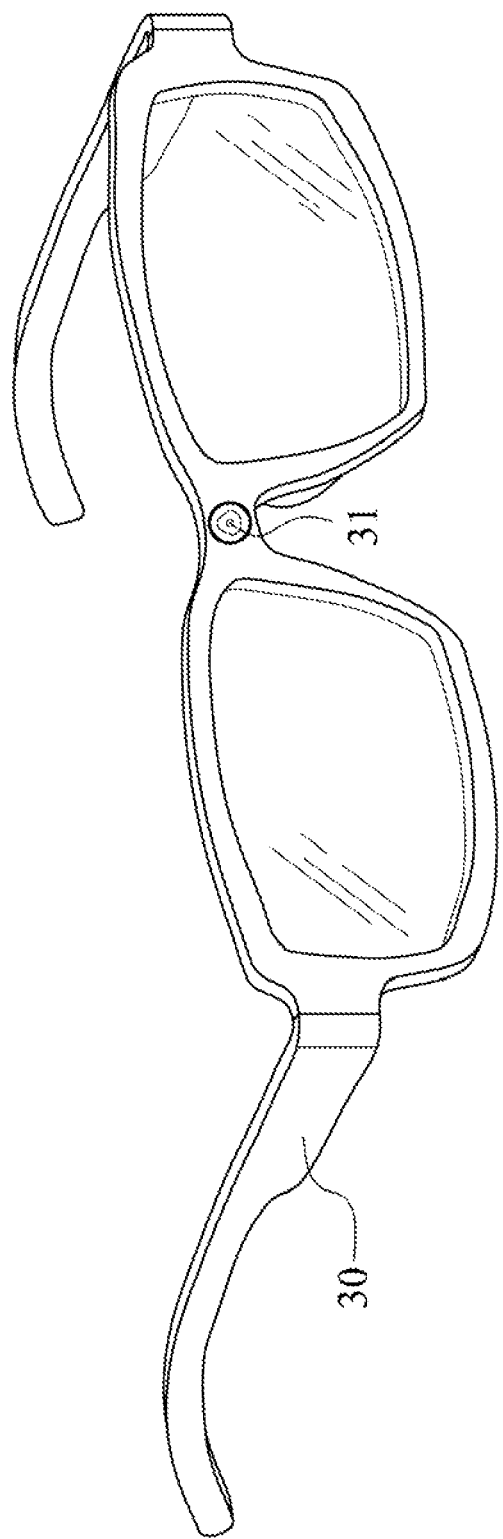
FIG. 20 shows a mobile terminal according to the 11th embodiment.

FIG. 20 is a schematic view of a mobile terminal 30 according to the 11th embodiment of the present disclosure. The mobile terminal 30 of the 11th embodiment is a head-mounted display, wherein the mobile terminal 30 includes an image capturing device 31. The image capturing device 31 includes an image capturing optical lens assembly (not otherwise herein labeled) according to the present disclosure and an image sensor (not otherwise herein labeled), wherein the image sensor is disposed on or near an image plane of the image capturing optical lens assembly.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing optical lens assembly comprising, in order from an object side to an image side:
a first lens element with refractive power having an object-side surface being convex in a paraxial region thereof;
a second lens element with positive refractive power having an object-side surface being convex in a paraxial region thereof;
a third lens element having negative refractive power;
a fourth lens element with positive refractive power having an image-side surface being convex in a paraxial region thereof, wherein an object-side surface and the image-side surface of the fourth lens element are aspheric; and
a fifth lens element with positive refractive power having an object-side surface being convex in a paraxial region thereof and an image-side surface being concave in a paraxial region thereof, wherein the image-side surface of the fifth lens element has at least one convex shape in an off-axis region thereof, and the object-side surface and the image-side surface of the fifth lens element are aspheric;
wherein the image capturing optical lens assembly has a total of five lens elements with refractive power, an axial distance between the object-side surface of the first lens element and an image plane is TL, a curvature radius of an image-side surface of the first lens element is R2, a vertical distance between a non-axial critical point on the image-side surface of the fifth lens element and an optical axis is Yc52, a central thickness of the second lens element is CT2, a central thickness of the fourth lens element is CT4, and the following conditions are satisfied:

$TL/R2<4.8;$ $TL/Yc52<4.5;$ and $0<CT2/CT4<1.25.$

2. The image capturing optical lens assembly of claim 1, wherein the object side surface of the fourth lens element is concave in a paraxial region thereof.

3. The image capturing optical lens assembly of claim 1, wherein a focal length of the first lens element is ft a focal length of the second lens element is f2, and the following condition is satisfied:

$0<f2/|f1|<1.0.$

4. The image capturing optical lens assembly of claim 1, wherein a curvature radius of an object-side surface of the third lens element is R5, curvature radius of an image-side surface of the third lens element is R6, and the following condition is satisfied:

$-0.6<(R5+R6)/(R5-R6).$

5. The image capturing optical lens assembly of claim 1, wherein an axial distance between the third lens element and the fourth lens element is T34, an axial distance between the fourth lens element and the fifth lens element is T45, and the following condition is satisfied:

0<*T*45/*T*34<10.0.

6. The image capturing optical lens assembly of claim 1, wherein the axial distance between the object-side surface of the first lens element and the image plane is TL, the curvature radius of the image-side surface of the first lens element is R2, and the following condition is satisfied:

−2.0<*TL*/*R*2<4.0.

7. The image capturing optical lens assembly of claim 1, further comprising:
a stop, wherein an axial distance between the stop and the image-side surface of the fifth lens element is Sd, an axial distance between the object-side surface of the first lens element and the image-side surface of the fifth lens element is Td, and the following condition is satisfied:

0.80<*Sd*/*Td*<1.10.

8. The image capturing optical lens assembly of claim 1, wherein a focal length of the fifth lens element is f5, a curvature radius of the image-side surface of the fifth lens element is R10, and the following condition is satisfied:

5.0≤*f*5/*R*10.

9. The image capturing optical lens assembly of claim 1, wherein a curvature radius of the image-side surface of the fourth lens element is R8, a focal length of the image capturing optical lens assembly is f, and the following condition is satisfied:

*R*8/*f*<−0.30.

10. The image capturing optical lens assembly of claim 1, wherein a half of a maximal field of view of the image capturing optical lens assembly is HFOV, and the following condition is satisfied:

0.85<1/tan(HFOV)<1.40.

11. An image capturing device, comprising:
the image capturing optical lens assembly of claim 1; and
an image sensor, wherein the image sensor is disposed on an image side of the fifth lens element of the image capturing optical lens assembly.

12. A mobile terminal, comprising:
the image capturing device of claim 11.

13. An image capturing optical lens assembly comprising, in order from an object side to an image side:
a first lens element with refractive power having an object-side surface being convex in a paraxial region thereof;
a second lens element having positive refractive power;
a third lens element with refractive power having an image-side surface being concave in a paraxial region thereof;
a fourth lens element with refractive power having an image-side surface being convex in a paraxial region thereof, wherein an object-side surface and the image-side surface of the fourth lens element are aspheric; and
a fifth lens element with positive refractive power having an object-side surface being convex in a paraxial region thereof and an image-side surface being concave in a paraxial region thereof, wherein the image-side surface of the fifth lens element has at least one convex shape in an off-axis region thereof, and the object-side surface and the image-side surface of the fifth lens element are aspheric;

wherein the image capturing optical lens assembly has a total of five lens elements with refractive power, an axial distance between the object-side surface of the first lens element and an image plane is TL, a curvature radius of an image-side surface of the first lens element is R2, a vertical distance between a non-axial critical point on the image-side surface of the fifth lens element and an optical axis is Yc52, and the following conditions are satisfied:

*TL*/*R*2<4.80; and

*TL*/*Yc*52<4.50.

14. The image capturing optical lens assembly of claim 1, wherein the second lens element has an object-side surface being convex in a paraxial region thereof.

15. The image capturing optical lens assembly of claim 14, wherein the third lens element has negative refractive power.

16. The image capturing optical lens assembly of claim 15, wherein a curvature radius of the object-side surface of the third lens element is R5, a curvature radius of the image-side surface of the third lens element is R6, and the following condition is satisfied:

−0.6<(*R*5+*R*6)/(*R*5−*R*6).

17. The image capturing optical lens assembly of claim 15, wherein a focal length of the image capturing optical lens assembly is f, a focal length of the second lens element is f2, and the following condition is satisfied:

0.5<*f*/*f*2<2.0.

18. The image capturing optical lens assembly of claim 15, wherein a curvature radius of the image-side surface of the fourth lens element is R8, a focal length of the image capturing optical lens assembly is f, and the following condition is satisfied:

*R*8/*f*<−0.30.

19. The image capturing optical lens assembly of claim 13, wherein the refractive power of the fifth lens element changes from positive at a paraxial region to negative at an off-axis region of the fifth lens element.

20. The image capturing optical lens assembly of claim 13, wherein the object-side surface and the image-side surface of the first through fifth lens elements are aspheric, and the first through fifth lens elements are made of plastic material, and the image capturing optical lens assembly further comprising:
a stop, wherein an axial distance between the stop and the image-side surface of the fifth lens element is Sd, an axial distance between the object-side surface of the first lens element and the image-side surface of the fifth lens element is Td, and the following condition is satisfied:

0.80<*Sd*/*Td*<1.10.

21. An image capturing device, comprising:
the image capturing optical lens assembly of claim 13; and
an image sensor, wherein the image sensor is disposed on an image side of the fifth lens element of the image capturing optical lens assembly.

22. A mobile terminal, comprising:
the image capturing device of claim 21.

* * * * *